United States Patent
Chang

(10) Patent No.: US 8,614,685 B2
(45) Date of Patent: Dec. 24, 2013

(54) CAPACITIVE TOUCH SCREEN

(75) Inventor: Chin-Fu Chang, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 74 days.

(21) Appl. No.: 13/211,873

(22) Filed: Aug. 17, 2011

(65) Prior Publication Data

US 2012/0169652 A1 Jul. 5, 2012

Related U.S. Application Data

(60) Provisional application No. 61/428,499, filed on Dec. 30, 2010, provisional application No. 61/435,568, filed on Jan. 24, 2011, provisional application No. 61/472,971, filed on Apr. 7, 2011.

(51) Int. Cl.
*G06F 3/041* (2006.01)
*G06F 3/045* (2006.01)

(52) U.S. Cl.
USPC .......................... 345/173; 345/174

(58) Field of Classification Search
None
See application file for complete search history.

(56) References Cited

U.S. PATENT DOCUMENTS

| | | | | |
|---|---|---|---|---|
| 7,548,073 B2 * | 6/2009 | Mackey et al. | | 324/660 |
| 7,692,431 B2 * | 4/2010 | Mackey | | 324/660 |
| 8,269,743 B2 | 9/2012 | Kuo et al. | | |
| 2008/0062148 A1* | 3/2008 | Hotelling et al. | | 345/174 |
| 2008/0259053 A1* | 10/2008 | Newton | | 345/175 |
| 2009/0213090 A1* | 8/2009 | Mamba et al. | | 345/174 |
| 2010/0110038 A1* | 5/2010 | Mo et al. | | 345/174 |
| 2010/0289759 A1* | 11/2010 | Fisher et al. | | 345/173 |
| 2011/0032193 A1* | 2/2011 | Szalkowski | | 345/173 |
| 2011/0050617 A1* | 3/2011 | Murphy et al. | | 345/174 |

FOREIGN PATENT DOCUMENTS

| | | |
|---|---|---|
| CN | 101393502 | 3/2009 |
| TW | 201102895 | 7/2009 |
| TW | 201015409 | 4/2010 |
| TW | 201033875 | 9/2010 |

* cited by examiner

*Primary Examiner* — Alexander Eisen
*Assistant Examiner* — Nan-Ying Yang
(74) *Attorney, Agent, or Firm* — WPAT, PC; Justin King

(57) ABSTRACT

The present invention provides a mutual capacitive multi-touch screen, which includes a guarding pattern and a conductive strip pattern exposed from each other. The conductive strip pattern includes a plurality of first conductive strips provided with a driving signal and a plurality of second conductive strips for providing mutual capacitive coupling signals, and the guarding pattern is provided with a DC signal.

18 Claims, 14 Drawing Sheets

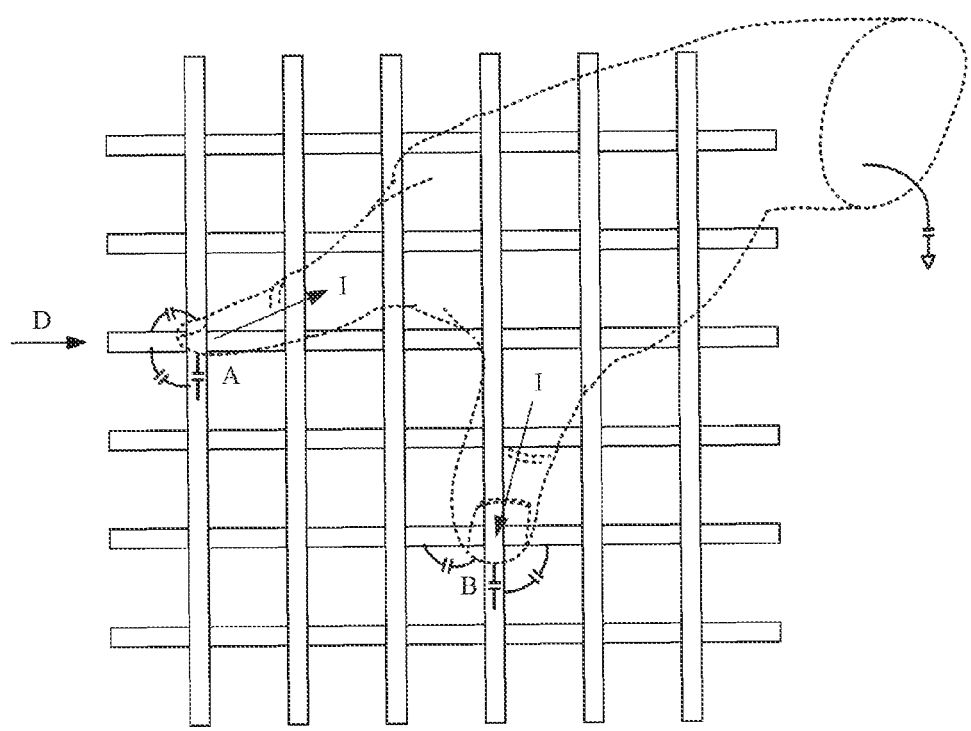
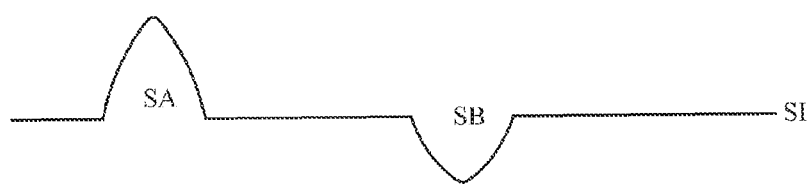
FIG. 1A (Prior Art)

```
┌─────────────────────────────────────┐
│ A capacitive touch sensitive display│
│  without a rear shielding layer is  │
│  provided, which includes a         │
│  plurality of exposed conductive    │
│  strips and a display. The exposed  │
│  area of the first conductive       │
│  strips is larger than the exposed  │
│  area of the second conductive      │
│  strips.                            │
│                 510                 │
└─────────────────────────────────────┘
                  │
                  ▼
┌─────────────────────────────────────┐
│   A driving signal is simultaneously│
│   and continuously provided to at   │
│   least one first conductive strip. │
│                 520                 │
└─────────────────────────────────────┘
                  │
                  ▼
┌─────────────────────────────────────┐
│ Sensing information is generated    │
│ based on the mutual capacitive      │
│ coupling signals provided by the    │
│ second conductive strips each time  │
│ the driving signal is provided,     │
│ wherein each value of the sensing   │
│ information is the difference       │
│ between a pair of second conductive │
│ strips or the difference between    │
│ signal differences of two pairs of  │
│ conductive strips among three       │
│ conductive strips, and the          │
│ difference suppresses noise coming  │
│ from the display.                   │
│                 530                 │
└─────────────────────────────────────┘
```

FIG. 5

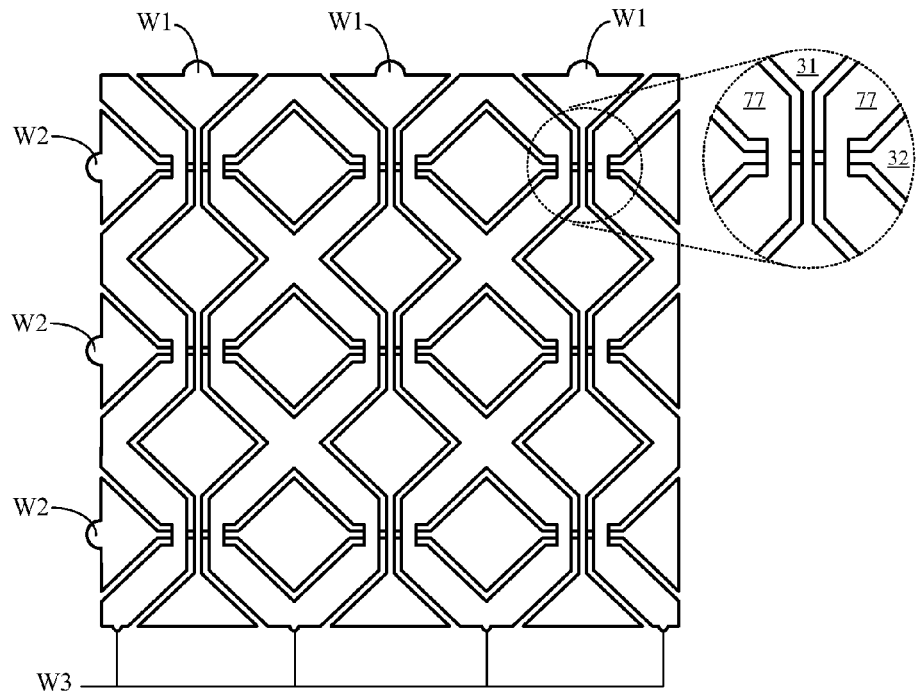

FIG. 7E

| A capacitive touch screen with a guarding pattern is provided, the guarding pattern and a conductive strip pattern on the capacitive touch screen being exposed from one another. 810 |
|---|

↓

| A driving signal is simultaneously and continuously provided to at least one first conductive strip, and a DC signal is provided to first conductive strips not driven by the driving signal. 820 |
|---|

↓

| Sensing information is generated based on the mutual capacitive coupling signals provided by the second conductive strips each time the driving signal is provided, wherein each value of the sensing information is a difference between a pair of signals of the second conductive strips or the difference between signal differences of two pair of conductive strips among three conductive strips, and the difference suppresses the noise coming from the display. 830 |
|---|

FIG. 8

CAPACITIVE TOUCH SCREEN

CROSS REFERENCE TO RELATED APPLICATIONS

This application claims the benefit of U.S. Provisional Application No. 61/472,971, filed on Apr. 7, 2011, Provisional Application No. 61/435,568, filed on Jan. 24, 2011 and U.S. Provisional Application No. 61/428,499, filed on Dec. 30, 2010, which are herein incorporated by reference for all intents and purposes.

BACKGROUND OF THE INVENTION

1. Field of the Invention

The present invention relates to capacitive touch screens, and more particularly, to a capacitive touch screen that reduces the effect of negative touches.

2. Description of the Prior Art

Referring to FIG. 1A, when a driving signal D is provided by a conductive strip being driven, the signal may flow from a first finger A to another finger B of the same hand, such that, during scanning of sensing information SI, sensed conductive strips corresponding to fingers A and B will sense variations in mutual-capacitive coupling signals, such as touch-related sensing information SA and SB shown, respectively. It can be seen from FIG. 1A that the directions in which the touch-related sensing information SA and SB variations are opposite to each other, that is, the signals are opposite.

The touch-related sensing information SA represents the variation in capacitive coupling at the intersection between a sensed conductive strip corresponding to the location of the first finger A and a driven conductive strip. In this case, a true touch exists. Similarly, the touch-related sensing information SB represents the variation in capacitive coupling at the intersection between a sensed conductive strip corresponding to the location of the second finger B and a driven conductive strip. However, the intersection represented by the touch-related sensing information SB is not actually being touched, thus it is a "negative touch", i.e. a "phantom touch". In the following descriptions, a signal flowing out of a conductive strip due to capacitive coupling of the first finger A is called a true-touch signal, while a signal flowing out of a conductive strip due to capacitive coupling of the second finger B is called a negative-touch signal. Thus, the variations in capacitive couplings corresponding to the true-touch and negative-touch signals detected on the conductive strips are true touch-related sensing information and negative touch-related sensing information, respectively.

Referring to FIG. 1B, when the first finger A and the second finger B are on the same or nearby sensed conductive strip(s), the corresponding touch-related sensing information SA and SB will cancel each other as the signals are opposite to each other, thus reducing the signal. When the intensities of the touch-related sensing information SA and SB are close to each other, the resulting signal may be too small to be determined as a true touch. In the following descriptions, the situation in which such distortion of the variation in the detected capacitive coupling of the true touch caused by the negative and true touches being close to each other is called "negative-touch effect".

In the above example, the first finger A and the second finger B are capacitively coupled to the conductive strips via an insulating surface layer. The thinner the insulating surface layer, the greater the negative-touch effect. In other words, the greater the distortion of the variation in the detected capacitive coupling of the true touch. Furthermore, the larger the number of negative touches caused by the second finger B, the larger the total number of negative-touch signals is larger, and the greater the distortion of the variation in the detected capacitive coupling of the true touch, even to the extent that an original true touch-related sensing information is regarded as an negative touch-related sensing information. In other words, in the worst-case scenario in which all the signals from the second finger B and the signal from the first finger A are on the same detected conductive strip, the negative-touch effect is greatest at this time. Needless to say, in mutual-capacitive coupling, tolerance to the negative-touch effect determines if the location of a true touch can be correctly detected and the number of locations of true touches that can be detected at the same time.

The negative-touch effect is more severe in portable devices. This is because the ground that is in contact with a portable device is different from the ground that is in contact with a human body. In order to meet market demands, thinner portable devices are desired, and as a result of this, the capacitive touch screen is also made thinner. The capacitive touch screens are usually disposed on the display, so noise coming from the display constantly interferes with the capacitive touch screen. In order to reduce interference, the most direct way is to add a rear shielding layer to the back (the portion nearer to the display) of the capacitive touch screen, which connects a ground potential to eliminate noise coming from the display. However, the addition of the rear shielding layer inevitably increases the thickness of the capacitive touch screen. This does not meet the requirements of the markets.

Another approach that does not require the addition of a rear shielding layer while reducing the interference of the noise from the display is to arrange conductive strips provided with the driving signal (driven conductive strips) on the lower layer, and the sensed conductive strips on the upper layer in a double ITO (DITO) structure, wherein the driven conductive strips cover the most of the display. Except for the conductive strips provided with the driving signal, all the other strips are provided with ground potential, thus creating an effect similar to a shielding layer. Since the sensed conductive strips are on the upper layer, in order to reduce the negative-touch effect, the thickness of the insulating surface layer cannot be effectively made thinner. When the insulating surface layer is made of a glass material, the distance between a sensed conductive strip and the finger tip needs to be kept at about 1.1 mm or above. Even if a plastic material is adhered to the supporting glass, the distance between a sensed conductive strip and the finger tip needs to be kept at about 0.7 mm or above. With such strict restrictions to the thickness of the insulating surface layer, the remaining solution is to reduce the thickness of an insulating intermediate layer between the driven conductive strips and the sensed conductive strips.

Compared to a DITO structure, the thickness of the insulating surface layer in a single ITO (SITO) structure also faces the same limitation. However, there is no insulating intermediate layer, so the overall thickness is much smaller than the DITO structure, but the shielding effect is also lost. If noise interference cannot be effectively eliminated, then it is better to arrange the SITO structure inside the display (in cell). If it is arranged above the display, then the provision of a rear shielding layer may become a necessity.

Noise interference arising from the display hinders the ability to correctly determine the location of a true touch, while the negative-touch effect affects the ability to correctly determine the locations of multiple true touches. Obviously, in order to reduce the thickness of the capacitive touch screens, one needs to consider the distance between the sensed conductive strips and the finger tip, and moreover, how to eliminate the noise interference coming from the display.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

When mutual capacitive multi-touch detection is performed on a mutual-capacitive multi-touch screen, the driving signal may flow from a first finger to a second finger of the same palm by capacitive coupling, which may reduce the signal or signal variation indicating the location of a true touch, causing misjudgment of the true touch. One objective of the present invention is thus to reduce the negative-touch effect flowing between the fingers.

When mutual capacitive multi-touch detection is performed on a mutual-capacitive multi-touch screen, capacitive coupling of signals flowing between multiple external conductive objects and into the multi-touch screen may severely distort the variations in detected capacitive coupling of a true touch. In order to avoid this problem, the thickness of an insulating surface layer cannot effectively be made thinner.

Thus, the objective of the present invention is to reduce the proportion of the driving signal flowing into a detected conductive strip again from a conductive strip by capacitive coupling of external conductive objects through the insulating surface layer. This is achieved by providing a conductive strip pattern, which allows capacitive coupling between a driven conductive strip and an external conductive object to be greater than capacitive coupling between a detected conductive strip and the external conductive object. Thereby, negative touch effect is reduced, and this in turn reduces the thickness of the insulating surface layer.

In addition, with the addition of a guarding pattern provided with a DC signal on the mutual-capacitive multi-touch screen, the guarding pattern and a conductive strip pattern are exposed from each other, and the guarding pattern allows that, when a touch range of each external conductive object on the mutual-capacitive multi-touch screen is larger than a predetermined condition, capacitive coupling between each external conductive object and the guarding pattern is larger than capacitive coupling between the external conductive object and the second conductive strips or larger than capacitive coupling between the external conductive object and the conductive strip pattern, or capacitive coupling between each external conductive object and the guarding pattern and the first conductive strips is larger than capacitive coupling between the external conductive object and the second conductive strips, thereby effectively reducing the proportion of the driving signal flowing out of the conductive strip by capacitive coupling with a plurality of external conductive objects with an insulating surface layer therebetween and into a conductive strip being detected.

In addition, capacitive coupling signals of the detected conductive strips are represented by differential values or dual differential values. This effectively reduces noise interferences coming from the rear display, eliminating the need for a rear shielding layer, and reducing the thickness of the mutual capacitive multi-touch screen. In the case where capacitive coupling signals of the detected conductive strips are represented by dual differential values, signal distortions due to deformations can also be reduced.

In a mutual capacitive multi-touch screen proposed by the present invention, the conductive strip pattern allows that the exposed area of the guarding pattern covered by a touch range of a valid touch for which a correct position can be detected to be larger than the exposed area of the detected conductive strips or larger than the exposed area of the conductive strip pattern, or the exposed areas of the guarding pattern and the driven conductive strips covered by the touch range is larger than the area of the detected conductive strips covered by the touch range, and capacitive coupling between a driven conductive strip and an external conductive object is greater than capacitive coupling between a detected conductive strip and the external conductive object. Therefore, when the driving signal flows into a conductive strip from a conductive strip by capacitive coupling of external conductive objects through the insulating surface layer, the influence of the signal flowing into the detected conductive strip on the position detection is reduced.

In another mutual capacitive multi-touch screen proposed by the present invention, capacitive coupling between a driven conductive strip and an external conductive object is made to be greater than capacitive coupling between a detected conductive strip and the external conductive object by making the distance between the driven conductive strip and the external conductive object to be larger than the distance between the detected conductive strip and the external conductive object. Therefore, when the driving signal flows into a conductive strip from a conductive strip by capacitive coupling of external conductive objects through the insulating surface layer, the influence of the signal flowing into the detected conductive strip on the position detection is reduced.

Obviously, in the mutual capacitive multi-touch screens, compared to the detected conductive strip, the driven conductive strip may be both closer to the external conductive object and have a larger exposed area.

The objectives of the present invention can be achieved by the following technical schemes. A detection method for a capacitive touch sensitive display according to the present invention includes: providing a capacitive touch screen, including: a conductive strip pattern having a plurality of conductive strips exposed from each other, the conductive strip pattern including: a plurality of first conductive strips operatively provided with a driving signal during mutual capacitive detection; and a plurality of second conductive strips providing mutual capacitive coupling signals, the first conductive strips and the second conductive strips being exposed and separated from each other; and a guarding pattern including a plurality of openings and overlying the conductive strip pattern, wherein the guarding pattern is provided with a direct current (DC) signal, and the conductive strip pattern is exposed from the openings; simultaneously and continuously providing the driving signal to at least one first conductive strip, and providing a DC signal to first conductive strips not driven by the driving signal; and generating sensing information based on the mutual capacitive coupling signals provided by the second conductive strips each time the driving signal being provided, wherein each value of the sensing information is the difference between a pair of second conductive strips or the difference between signal differences of two pairs of conductive strips among three conductive strips, and the difference suppresses noise coming from a display, wherein this conductive strip pattern allows that, when a touch range of each external conductive object on the capacitive touch screen is larger than a predetermined condition, the exposed area of the guarding pattern covered by each touch range is larger than the exposed area of the second conductive strips covered by the touch range or larger than the exposed area of the conductive strip pattern covered by the touch range, or the exposed areas of the guarding pattern and the first conductive strips covered by each touch range is larger than the exposed area of the second conductive strips covered by the touch range, such that the proportion of the driving signal flowing out of the first conductive strip via at least one first external conductive object in the external conductive objects and into the second conductive strip via at least one second external conductive object in the external conductive objects decreases as the number of second external conductive objects increases.

The objectives of the present invention can be further achieved by the following technical measures.

The openings expose a plurality of intersecting regions of the first conductive strips and the second conductive strips.

The guarding pattern covers a plurality of intersecting regions of the first conductive strips and the second conductive strips.

The guarding pattern includes a plurality of guarding conductive strips, the guarding conductive strips have a plurality of openings, wherein the intervals between the guarding conductive strips expose one of the first conductive strips and the second conductive strips, and the openings expose the other of the first conductive strips and the second conductive strips.

The second conductive strips are on the same layer as the first conductive strips or on a layer further away from an insulating surface layer, wherein the external conductive objects approach or touch the insulating surface layer, and the conductive pattern is positioned between the insulating surface layer and the conductive strip pattern.

Capacitive coupling between each external conductive object and the second conductive strips is smaller than capacitive coupling between the external conductive object and the guarding pattern or smaller than capacitive coupling between the external conductive object and the guarding pattern and the first conductive strips.

The predetermined condition is a width or an area, and the exposed area of the first conductive strips is greater than the exposed area of the second conductive strips.

The periphery of the capacitive touch screen is fixed to a display, and the portion of the capacitive touch screen not fixed to the display deforms under pressure, wherein each value of the sensing information is the difference between signal differences between the first two conductive strips and the latter two conductive strips among the three conductive strips.

The proportion of the driving signal flowing out of the first conductive strip via at least one first external conductive object in the external conductive objects and into the first conductive strip provided with the DC signal via at least one second external conductive object in the external conductive objects increases as the number of second external conductive objects increases.

The first conductive strips and the second conductive strips are composed of a plurality of connecting lines connecting a plurality of conductive pads, and the conductive pads are exposed from the openings.

The objectives of the present invention can be achieved by the following technical schemes. A capacitive touch screen according to the present invention includes a conductive strip pattern having a plurality of conductive strips exposed from each other, the conductive strip pattern including: a plurality of first conductive strips operatively provided with a driving signal during mutual capacitive detection, wherein first conductive strips not provided with the driving signal are provided with a direct current (DC) signal; and a plurality of second conductive strips providing mutual capacitive coupling signals, the first conductive strips and the second conductive strips being exposed and separated from each other; and a guarding pattern including a plurality of openings and overlying the conductive strip pattern, wherein the guarding pattern is provided with the DC signal, and the conductive strip pattern is exposed from the openings, wherein the conductive strip pattern and the guarding pattern allow that, when a touch range of each external conductive object on the capacitive touch screen is larger than a predetermined condition, capacitive coupling between each external conductive object and the guarding pattern is larger than capacitive coupling between the external conductive object and the second conductive strips or larger than capacitive coupling between the external conductive object and the conductive strip pattern, or capacitive coupling between each external conductive object and the guarding pattern and the first conductive strips is larger than capacitive coupling between the external conductive object and the second conductive strips, such that the proportion of the driving signal flowing out of the first conductive strip via at least one first external conductive object in the external conductive objects and into the second conductive strip via at least one second external conductive object in the external conductive objects decreases as the number of second external conductive objects increases.

The objectives of the present invention can be further achieved by the following technical measures.

The openings expose a plurality of intersecting regions of the first conductive strips and the second conductive strips.

The guarding pattern covers a plurality of intersecting regions of the first conductive strips and the second conductive strips.

The guarding pattern includes a plurality of guarding conductive strips, the guarding conductive strips have a plurality of openings, wherein the intervals between the guarding conductive strips expose one of the first conductive strips and the second conductive strips, and the openings expose the other of the first conductive strips and the second conductive strips.

The second conductive strips are on the same layer as the first conductive strips or on a layer further away from an insulating surface layer, wherein the external conductive objects approach or touch the insulating surface layer, and the conductive pattern is positioned between the insulating surface layer and the conductive strip pattern.

The exposed area of the guarding pattern covered by the touch range is larger than the exposed area of the second conductive strips covered by the touch range, or and the exposed areas of the first conductive strips provided with the DC signal and the guarding pattern covered by the touch range is larger than the exposed area of the second conductive strips covered by the touch range.

The predetermined condition is a width or an area, and the exposed area of the first conductive strips is greater than the exposed area of the second conductive strips.

The capacitive touch screen further includes a control circuit for performing the following operations: simultaneously and continuously providing the driving signal to at least one first conductive strip; and generating sensing information based on the mutual capacitive coupling signals provided by the second conductive strips each time the driving signal being provided, wherein each value of the sensing information is the difference between a pair of second conductive strips or the difference between signal differences of two pairs of conductive strips among three conductive strips, wherein the capacitive touch screen is fixed to the display, and a rear shielding layer coupled to a DC signal is not present between the display and the conductive strips, and the difference suppresses noise coming from the display.

The periphery of the capacitive touch screen is fixed to the display, and the portion of the capacitive touch screen not fixed to the display deforms under pressure, wherein each value of the sensing information is the difference between signal differences between the first two conductive strips and the latter two conductive strips among the three conductive strips.

Compared to the prior art in which the negative-touch effect increases as the number of external conductive objects which facilitates flowing of signals out of conductive strips increases, in the disclosed technical schemes of present invention, the negative-touch effect decreases as the number of external conductive objects which facilitates flowing of signals out of conductive strips increases, which is contrary to the prior art. This means a higher tolerance to negative-touch effect, and the thickness of the insulating surface layer can be thinner.

In addition, the larger the exposed area of the guarding pattern, the ability to resist noise coming from external conductive objects is stronger.

BRIEF DESCRIPTION OF THE DRAWINGS

The present invention can be more fully understood by reading the following detailed description of the preferred embodiments, with reference made to the accompanying drawings, wherein:

FIGS. 1A and 1B are schematic diagrams depicting the negative-touch effect in the prior art;

FIG. 5 is a flowchart illustrating a detection method for a capacitive touch sensitive display according to a second embodiment of the present invention.

FIG. 7E is a schematic diagram depicting a guarding pattern according to a seventh embodiment of the present invention;

FIG. 8 is a flow chart illustrating a detection method of a capacitive touch screen according to an eighth embodiment of the present invention;

DETAILED DESCRIPTION OF THE PREFERRED EMBODIMENTS

Figure 1B:
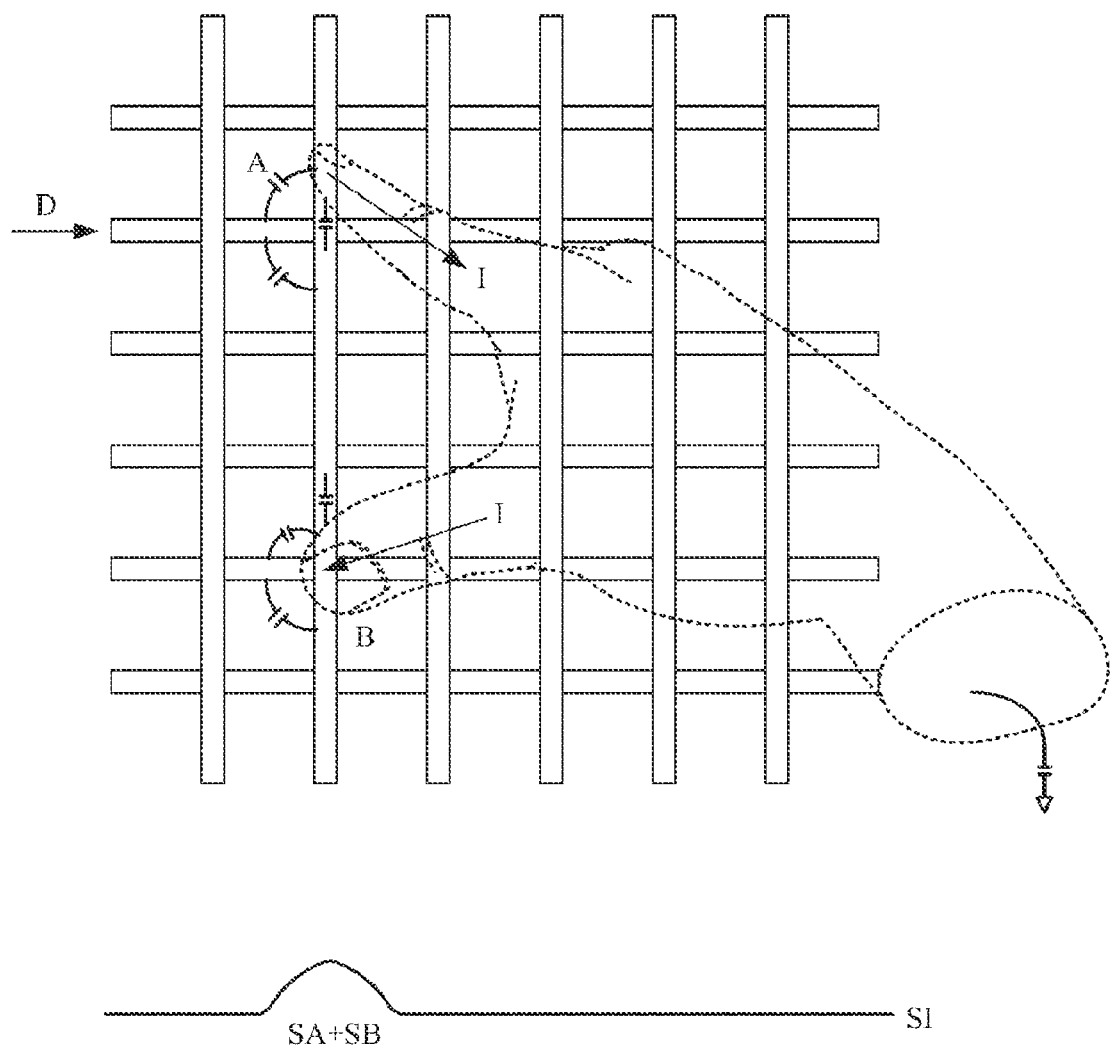

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1C:
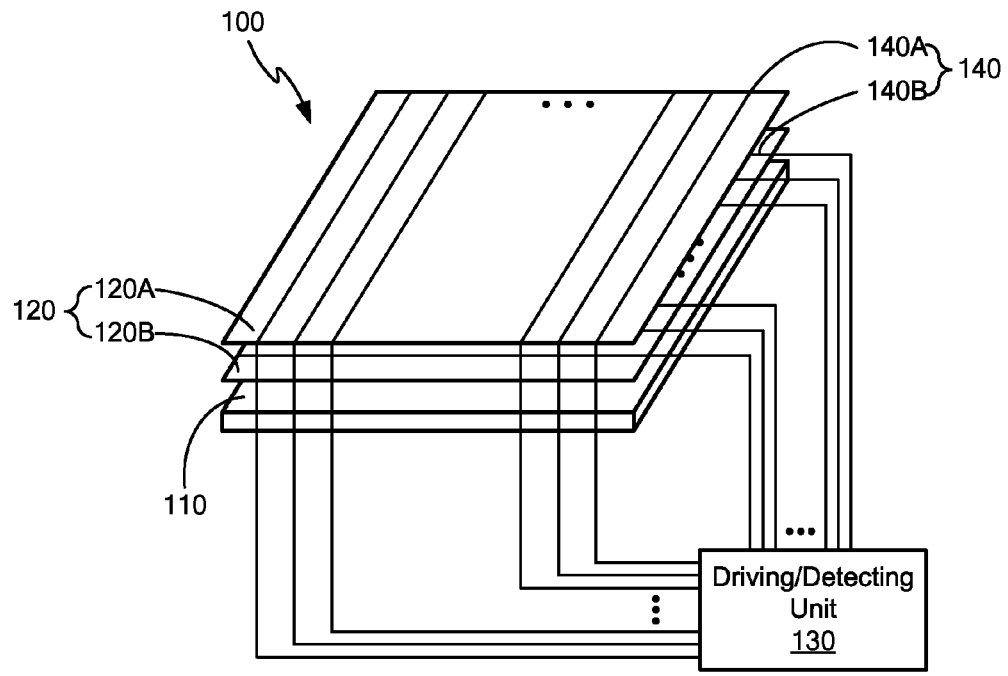
FIGS. 1C and 1D are schematic diagrams depicting a position detecting system.
Figure 1D:
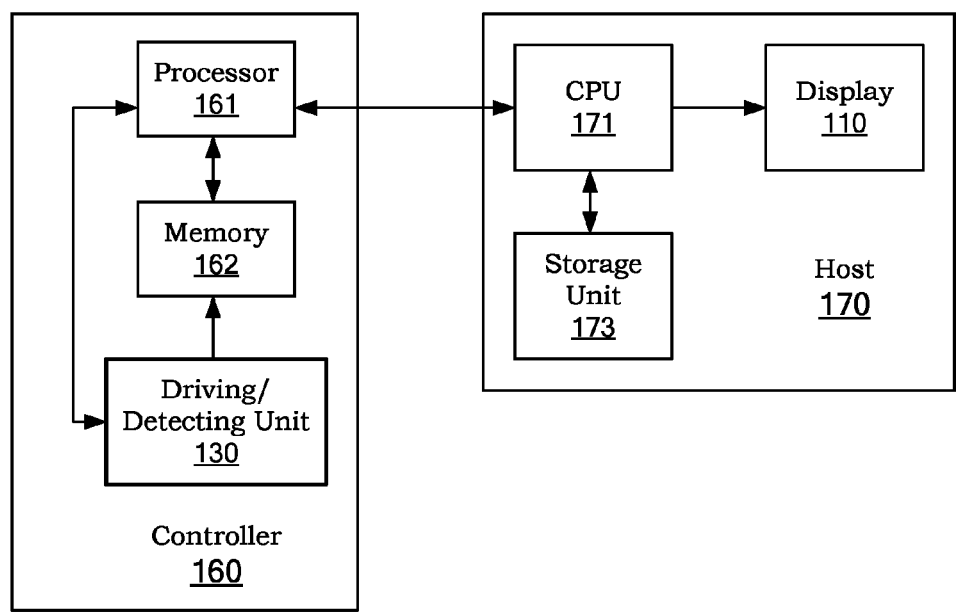

Referring to FIG. 1C, the present invention provides a position detecting device 100, which includes a sensing device 120 and a driving/detecting unit 130. The sensing device 120 has a sensing layer. In an example of the present invention, the sensing layer can include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B cross each other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, some of the conductive strips 140 that are not being directly driven by the driving/detecting unit 130 are detected. In addition, the sensing device 120 can be disposed on a display 110. An optional rear shielding layer (not shown) can be interposed between the sensing device 120 and the display 110. In a preferred example of the present invention, there is no rear shielding layer between the sensing device 120 and the display 110 so as to reduce the thickness of the sensing device 120.

Figure 1E:
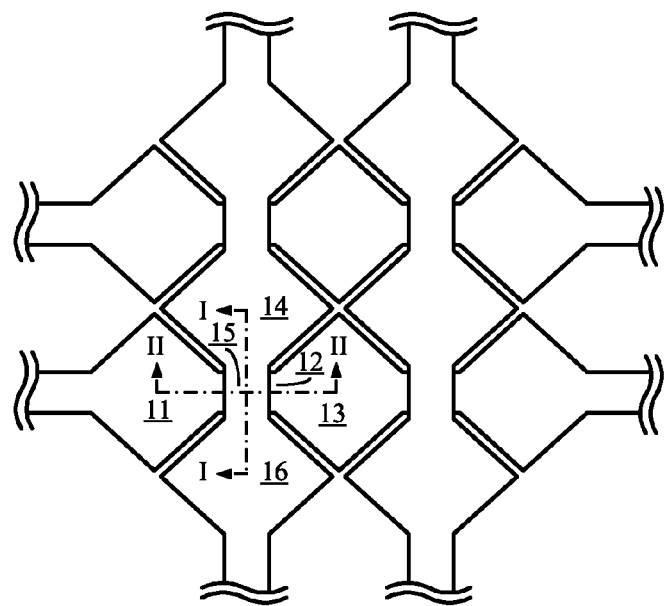
FIGS. 1E to 1H are schematic diagrams depicting a sensing layer.
Figure 1F:
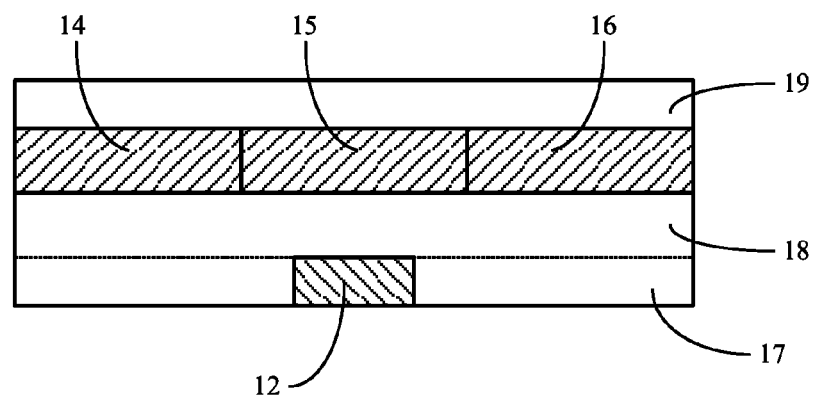
Figure 1G:
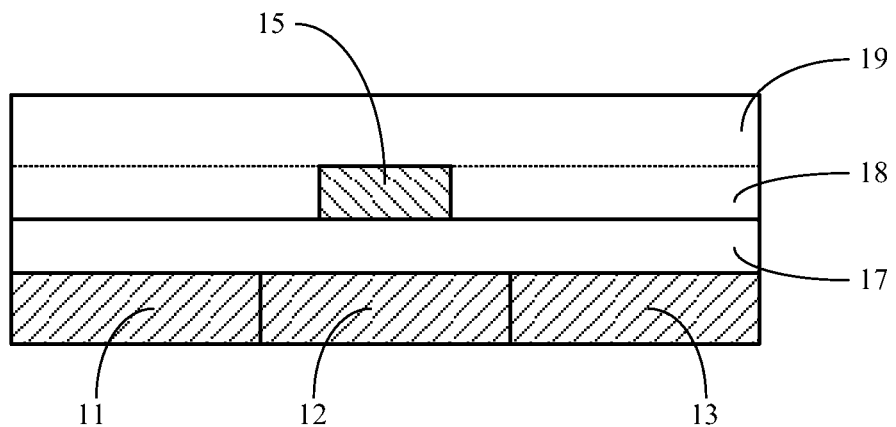

The position detecting device 100 of the present invention can be applied to a computing system as shown in FIG. 1G, which includes a controller 160 and a host 170. The controller includes the driving/detecting unit 130 to operatively couple the sensing device 120 (not shown). In addition, the controller 160 can include a processor 161 for controlling the driving/detecting unit 130 in generating the sensing information. The sensing information can be stored in a memory 162 and accessible by the processor 161. Moreover, the host 170 constitutes the main body of the computing system, and mainly includes a central processing unit 171, a storage unit 173 that can be accessed by the central processing unit 171, and the display 110 for displaying results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be positions (e.g. coordinates), identified results (e.g. gesture codes), commands, sensing information or other information provided by the controller 160.

In an example of the present invention, the sensing information can be initial sensing information generated under the control of the processor 161, and this information is passed onto the host 170 for position analysis, such as position analysis, gesture determination, command identification, and so on. In another example of the present invention, the sensing information can be analyzed by processor 161 first before forwarding the determined positions, gestures, commands, or the like to the host 170. The present invention does not limit to this example, and one with ordinary skill in the art can readily recognize other interactions between the controller 160 and the host 170.

Referring to FIG. 1E, a pattern of a conventional capacitive touch sensor is shown, which includes a plurality of conductive pads and a plurality of connecting lines. These connecting lines include a plurality of first connecting lines and a plurality of second connecting lines. These first connecting lines are arranged in a first direction (e.g. one of the horizontal and vertical directions) and are connected to a portion of these conductive pads to form a plurality of conductive strips arranged in the first direction. Similarly, these second connecting lines are arranged in a second direction (e.g. the other one of the horizontal and vertical directions) and are connected to another portion of these conductive pads to form a plurality of conductive strips arranged in the second direction.

These conductive strips (the first and second conductive strips) can be made of transparent or opaque materials, such as transparent Indium Tin Oxide (ITO). In terms of the structure, it can be categorized into a Single ITO (SITO) structure and a Double ITO (DITO) structure. One with ordinary skill in the art can appreciate that other materials can be used as the conductive strips, such as carbon nano tube, and they will not be further described.

In an example of the present invention, the vertical direction is regarded as the first direction, while the horizontal direction is regarded as the second direction. Thus, the vertical conductive strips are the first conductive strips, and the horizontal conductive strips are the second conductive strips. However, one with ordinary skill in the art can appreciate that the above is merely an example of the present invention, and the present invention is not limited to this. For example, the horizontal direction can be regarded as the first direction, while the vertical direction can be regarded as the second direction.

FIG. 1F is a cross-sectional diagram of FIG. 1E along a line I, which shows a substrate 17, a portion of a second conductive strip (including a conductive pad 11, a second connecting line 12, and a conductive pad 13), an insulating layer 18, a portion of a first conductive strip (including a first connecting line 15), and a surface layer 19. In an example of the present invention, the substrate 17, the insulating layer 18, and the surface layer 19 can be made of transparent or opaque materials, such as glass or a plastic film. One with ordinary skill in the art can recognize that other materials can be used for the elements described in this example, and they will not be further described.

In an example of the present invention, FIG. 1G is a cross-sectional diagram of FIG. 1E along a line II, illustrating the structure of a DITO capacitive touch sensor. It includes a substrate 17, a portion of a second conductive strip (including a second connecting line 12), an insulating layer 18, a portion of a first conductive strip (including a conductive pad 14, a first connecting line 15, and a conductive pad 16), and a surface layer 19.

Figure 1H:
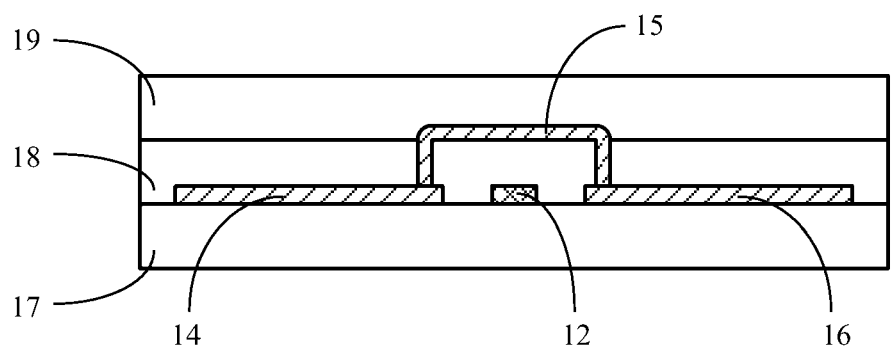

In an example of the present invention, FIG. 1H is a cross-sectional diagram of FIG. 1E along the line I, illustrating the structure of a SITO capacitive touch sensor. It includes a substrate 17, a portion of a second conductive strip (including a second connecting line 12), an insulating layer 18, a portion of a first conductive strip (including a conductive pad 14, a first connecting line 15, and a conductive pad 16), and a surface layer 19. The conductive pads 14 and 15 of the first conductive strip and the second connecting line 12 of the second conductive strip are co-planar, and the first connecting line 15 bridges over the second connecting line 12. The first connecting line 15 is electrically isolated from the second connecting line 12 by the insulating layer 18. One with ordinary skill in the art can appreciate other types of bridging, for example, instead of the "over-bridge" structure as shown in the present example, an "under-bridge" structure can be formed.

Referring back to FIG. 1A, the touch-related sensing information SA represents the variation in mutual capacitive coupling between the first finger A, a driven conductive strip, and a sensed conductive strip, while the touch-related sensing information SB represents the variation in mutual capacitive coupling between the second finger B and a sensed conductive strip.

Since the first finger A and the second finger B of the same hand touch or approach a sensed conductive strip simultaneously, a true-touch signal may be diminished by an opposite signal flowing through the fingers, as shown in FIG. 1B. The most direct way for solving this problem is to reduce the signal flowing to the sensed conductive strip through the fingers based on the fact that the level of capacitive coupling $$C = \epsilon \frac{A}{d},$$

that is, the level of capacitive coupling C is proportional to the area A of capacitive coupling, and inversely proportional to the distance of capacitive coupling.

Since there is an insulating surface layer between the fingers and the sensed conductive strips, so one way to reduce the signal flowing to the sensed conductive strip through the fingers is to increase the thickness of the insulating surface layer. In a preferred example of the present invention, the insulating surface layer can be a surface glass with an appropriate thickness of 1.0 mm and above or 1.1 mm and above.

However, as thinner portable devices are being demanded, the thinner the surface glass the better it is. In an example of the present invention, the thickness of the insulating surface layer may be required to be less than 0.7 mm. In view of this, an alternative way of reducing the signal flowing to the sensed conductive strip through the fingers is to reduce the exposed area of the sensed conductive strip.

Figure 2A:
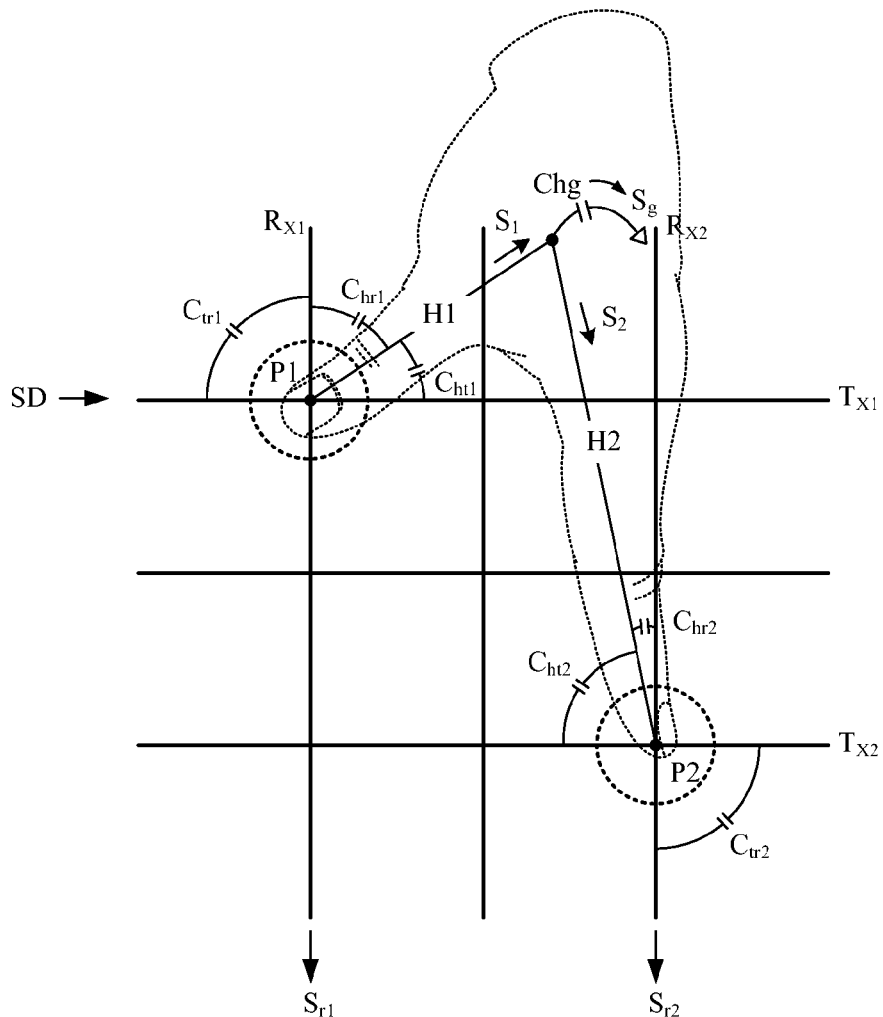
FIGS. 2A and 2B are schematic diagrams analyzing the negative-touch effect.

Referring to FIG. 2A, a first finger and a second finger of a human hand are touching a first touch zone P1 and a second touch zone P2, respectively. The first touch zone P1 covers the intersecting region of a first conductive strip Tx1 and a second conductive strip Rx1, and the second touch zone P2 covers the intersecting region of a first conductive strip Tx2 and a second conductive strip Rx2. When the first conductive strip Tx1 is provided with a driving signal SD, the rest of the first conductive strips including the first conductive strip Tx2 are provided with a DC signal, and each of the second conductive strips is detected individually. In an example of the present invention, those second conductive strips not yet detected can be provided with a DC signal. The DC signal can be provided by a ground circuit or a circuit that maintains a DC signal. Thus, in the present invention, coupling to a ground circuit or a DC circuit can be regarded as being provided with a DC signal, such as a circuit being grounded or a conductive strip being grounded. Similarly, coupling to a circuit that provides a driving signal can be regarded as being provided with a driving signal, for example, a circuit being driven or a conductive strip being driven. Furthermore, the driving signal SD can be provided to a plurality of first conductive strips simultaneously. In a preferred example of the present invention, the plurality of first conductive strips can be a plurality of conductive strips adjacent to one another, for example, two or three adjacent conductive strips. With a portion of the conductive strips being simultaneous driven, signals detected by the detected conductive strips can be adaptively controlled (increased), and the effect of moisture or conductive particles attached on the insulating surface layer during self-capacitive detection can be reduced.

In this diagram, when the driving signal SD is provided to the first conductive strip Tx1, the finger that is touching the first touch zone P1 is a true touch, and when the driving signal SD is provided to the first conductive strip Tx2, the finger that is touching the second touch zone P2 is a true touch. Similarly, the finger that causes an negative touch will be different according to which first conductive strip is driven by the driving signal SD. For the convenience of the descriptions, hereinafter, a finger of a true touch is called as a first finger, while a finger of an negative touch is called a second finger.

Accordingly, as for the first touch zone P1, the amount of capacitive coupling formed includes: the amount of capacitive coupling Ctr1 between the first conductive strip Tx1 and the second conductive strip Rx1; the amount of capacitive coupling Cht1 between the first conductive strip Tx1 and the first finger H1; and the amount of capacitive coupling Chr1 between the second conductive strip Rx1 and the first finger H1. Similarly, as for the second touch zone P2, the amount of capacitive coupling formed includes: the amount of capacitive coupling Ctr2 between the first conductive strip Tx2 and the second conductive strip Rx2; the amount of capacitive coupling Cht2 between the first conductive strip Tx2 and the second finger H2; and the amount of capacitive coupling Chr2 between the second conductive strip Rx2 and the second finger H2.

Moreover, some capacitive coupling Chg also exists between the device and a human body to which the first finger H1 and the second finger H2 belong. This value is usually between 10 pF and 250 pF, and the signal that passes through it is Sg.

Therefore, when the driving signal SD is provided to one or more first conductive strip(s) Tx1, a signal or signal variation of the intersecting region of each second conductive strip and the first conductive strip Tx1 is represented or obtained by detecting the signal of each second conductive strip. Similarly, the driving signal SD can be provided to other first conductive strips to represent or obtain signals or signal variations of all the intersecting regions. For example, signals Sr1 and Sr2 are sensed on the second conductive strips Rx1 and Rx2, which represent the amounts of capacitive couplings on the intersecting regions. These are compared with the amounts of capacitive couplings on the same intersecting regions when they are not touched to obtain the amounts of variations. Thus, when an external conductive object (e.g. a finger) touches the device, touched locations can be represented by the amounts or amounts of variations of capacitive coupling on these intersecting regions. Although the first finger H1 and the second finger H2 are each capacitive coupled to a first conductive strip and a second conductive strip, but one with ordinary skill in the art can understand that each finger can be capacitive coupled to a plurality of conductive strips.

Signal Sr1 may not be the only path from which the driving signal SD flows out, but some portion of the driving signal SD may flow from the conductive strip to an external conductive object, for example, from the conductive strip to the first finger H1 by capacitive coupling, indicated by a signal S1. All or part of the signal S1 may flow to ground or system ground via the external conductive object by capacitive coupling as indicated by a signal Sg, and some part of the signal S1 may flow via another external conductive object by capacitive coupling as indicated by a signal S2, for example, to a second conductive strip as indicated by signal Sr2 and/or to a first conductive strip provided with the DC signal.

Thus, not only variation of capacitive coupling is detected on the intersecting region of the first conductive strip Tx1 and the second conductive strip Rx1, but also on the intersecting region of the first conductive strip Tx1 and the second conductive strip Rx2. Since in reality, there is no actual capacitive coupling on the intersecting region of the first conductive strip Tx1 and the second conductive strip Rx2, but the detected signal indicates a variation in capacitive coupling, an negative touch is thus established. Further, the signal flows from the first finger to the second finger, thus the signals detected by the second conductive strips Rx 1 and Rx2 are opposite to each other. When the true-touch signal Sr1 detected on the second conductive strip Rx1 is regarded as a true touch signal, then the signal Sr2 detected on the second conductive strip Rx2 can be regarded as an negative-touch signal. If the two second conductive strips from the respective first touch zone P1 and the second touch zone P2 are in proximity or effectively the same strip, the signals of the true touch and the negative touch may cancel each other, possibly resulting in a situation in which the true-touch signal is too small to be detected. The more negative touches there are, the more prominent this situation is; sometimes, a true-touch signal is cancelled even to the extent that it becomes an negative-touch signal. It can be seen from the impedance/capacitance analysis, the capacitance of a circuit provided with a DC signal in the second touch zone P2 (since when the first conductive strip Tx1 is provided with the driving signal, the first conductive strip Tx2 is provided with a DC signal (e.g. grounded)) is Chg+Cht2, and the capacitance of the negative-touch signal with second conductive strip Rx2 is Chr2. Thus, the ratio of an negative touch to a true touch is GTR=(Chr2)/(Chg+Cht2). The smaller this ratio, the smaller the cancelling effect of the negative- and true-touch signals. Thus, in order to eliminate or reduce the effect of the negative-touch signal on the true-touch signal, the area of the circuit provided with the DC signal can be adjusted, such that when the second finger H2 approaches or contacts the second touch zone P2, most of the contact area is on the circuit provided with the DC signal (or the first conductive strip not being provided with the driving signal).

A solution to reduce the cancelling of the true- and negative-touch signals and hence the misjudgment of the true touch signal is to reduce the signal of the negative touch as much as possible. The most straightforward way is to increase the distance between the external conductive object and the second conductive strip, for example, the distance between the second finger H2 and the second conductive strip Rx2. In an example of the present invention, when the insulating surface layer is glass, the distance between the second finger H2 and the second conductive strip Rx2 is about 1.1 mm. This can effectively solve the problem of canceling effect of a single true-touch signal and a single negative-touch signal. However, when facing with the challenges of one true-touch signal cancelled by several negative-touch signals, the distance between the finger and the second conductive strip will have to be increased even further. The tolerance of the cancelling effect without making misjudgment is obviously limited by the distance between the finger and the second conductive strip. This distance is hardly smaller than 0.7 mm. Thus, the distance between the finger and the second conductive strip must increase in order to reduce the negative-touch signal. However, this does not meet the market needs for thinner capacitive touch screens.

It can be seen from the ratio of an negative touch to a true touch GTR=(Chr2)/(Chg+Cht2) that, in order to reduce the cancelling effect of the true- and negative-touch signals (hereinafter referred to as the negative-touch effect), the amount of capacitive coupling Chr2 between the second conductive strip and the finger must be reduced, and/or the amount of capacitive coupling between the finger and the circuit provided with the DC signal (Chg+Cht2) must be increased.

Accordingly, in an example of the present invention, a plurality of first conductive strips and a plurality of second conductive strips in one conductive strip pattern intersect with each other and are exposed. The area of the exposed first conductive strips is greater than that of the exposed second conductive strips. In another example of the present invention, in the case where capacitive coupling range of a valid touch made by an external conductive object is large enough for a location to be determined, the conductive strip pattern is such that the area of the exposed first conductive strip covered by or capacitively coupled to capacitive coupling range is greater than of the exposed second conductive strip covered by or capacitively coupled to capacitive coupling range. For example, the area exposed by the second conductive strip is smaller than half of the area exposed by the first conductive strip, and capacitive coupling range is larger than the area of each intersecting region. When the first and second conductive strips cover the entire or almost cover the entire active area of a capacitive touch screen, such conductive strip pattern allows the area of the exposed first conductive strip covered by or capacitively coupled to a capacitive coupling range of any valid touch across multiple intersecting regions to be greater than of the exposed second conductive strip covered by or capacitively coupled to capacitive coupling range.

The external conductive object causes a valid touch when the touch range is larger than a predetermined condition, wherein the valid touch results in a signal or signal variation sufficient for determining a location. The predetermined condition can be width (length), area, and the like. For example, the largest or smallest width (or area) of the touch range is greater than a predetermined value. Thus, in a SITO structure, the amount of capacitive coupling between the second finger H2 and the second conductive strip will be smaller than the amount of capacitive coupling between the second finger H2 and the DC signal.

In addition, in a DITO structure, the first conductive strips are on the upper layer, while the second conductive strips are on the lower layer. That is, the first conductive strips are on a layer that is closer to external conductive objects. Thus, if a touch range of any external conductive object on the capacitive touch panel is greater than a predetermined condition, thus forming a valid touch, and when the area of a first conductive strip covered by the touch range is greater than the area of a second conductive strip covered by the touch range, then the amount of capacitive coupling between the second finger H2 and the second conductive strip will be smaller than the amount of capacitive coupling between the second finger H2 and the circuit with the circuit provided with the DC signal.

In the prior art, in the case where the amount of capacitive coupling between the second finger H2 and the second conductive strip is not ensured to be smaller than the amount of capacitive coupling between the second finger H2 and the circuit provided with the DC signal, the greater the number of second fingers H2, the more the signals flowing into the second conductive strips by capacitive coupling between the second fingers H2 and the second conductive strips.

Figure 2B:
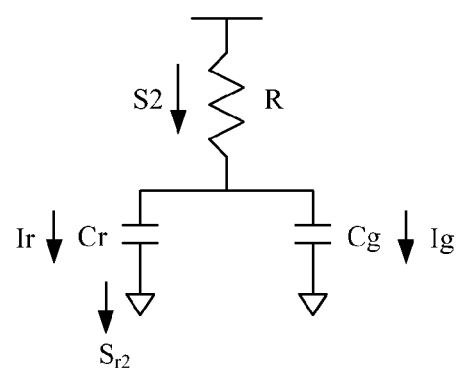

Referring to FIG. 2B, a schematic diagram illustrating an negative-touch signal S2 flowing into a conductive strip. The impedance R shown in the drawing indicates an impedance of the negative-touch signal S2 before flowing into the conductive strip. Since the signal of the driving signal capacitively coupled to the first finger H1 will flow through the second finger H2 and form a capacitive coupling Cr with the second conductive strip and a capacitive coupling Cg with the circuit provided with a DC signal (e.g. a first conductive strip not provided with the driving signal), a signal Ir flowing into the second conductive strip and a signal Ig flowing into the circuit provided with a DC signal are formed, respectively. Obviously, the driving signal after capacitive coupled to the first finger H1 flows into the second conductive strip and the circuit provided with a DC signal in parallel, when the number of second fingers H2 increases, the amounts of capacitive coupling Cr and Cg also increase. If the increase in capacitive coupling Cr is greater than the increase in capacitive coupling Cg, since the impedance is inversely proportional to the capacitance, the signal Ir will increase, and the signal Ig will decrease, that is, the negative-touch effect will increase.

Therefore, as the number of second fingers H2 causing negative touches increases, the distance between the second conductive strip and the second finger must also increase, for example, with a thicker insulating surface layer, so as to tolerate the negative-touch effect and avoid misjudgment of the locations of true touches. However, increasing the thickness of the insulating surface layer is against the objective of decreasing the thickness of the capacitive touch screen.

Accordingly, a technical mean for reducing the negative-touch effect according to the present invention adopts a conductive strip pattern, assuming the touch range of a valid touch is larger than a predetermined condition, the conductive strip pattern is designed such that the area of an exposed first conductive strip covered by any touch range larger than the predetermined condition must be larger than the area of an exposed second conductive strip covered. Thus, when the number of second fingers H2 increases, the increase in capacitive coupling Cg is greater than the increase in capacitive coupling Cr, and since the impedance is inversely proportional to the capacitance, the signal Ig will increase, and the signal Ir will decrease, that is, the negative-touch effect will decrease.

In a best mode of the present invention, the first conductive strips are on the upper layer of a DITO structure, while the second conductive strips are on the lower layer of the DITO structure. As shown in FIG. 3, the profiles of the exposed first conductive strips on the upper layer and second conductive strips on the lower layer are fairly equal, but the second conductive strips have openings, so the area of the exposed first conductive strips is larger than the area of the exposed second conductive strips.

The design and size of the openings are such that the amount of a signal of a driving signal capacitively coupled to at least one external conductive object flowing into a second conductive strip is smaller than that flowing into the circuit provided with the DC signal via capacitive coupling of other external conductive object(s). In other words, as mentioned before, when the number of second fingers H2 increase, the increase in capacitive coupling between the signal of the driving signal capacitively coupled to the at least one external conductive object and the second conductive strip is smaller than the increase in capacitive coupling between the signal of the driving signal capacitively coupled to the at least one external conductive object and the circuit provided with the DC signal. This in turn decreases the amount of the negative-touch signal S2 flowing into the second conductive strip, while increasing the amount of the negative-touch signal S2 flowing into the circuit provided with the DC signal.

In the present invention, assuming that the amount of signal flowing out of a conductive strip via capacitive coupling is the same, when the number of second fingers H2 increase, capacitive coupling between the second fingers H2 and the second conductive strips decreases. Under this condition, the thickness of the insulating surface layer only needs to able to tolerate the negative-touch effect of one second finger H2, which is to say that this thickness can tolerate the negative-touch effect arising from more second fingers H2. Tolerating the negative-touch effect means that when there are negative touches generated by one or more second fingers H2, the location of each true touch can be correctly determined.

According to the above, when a capacitive touch screen is not transparent, for example, a touch pad used as pointing device in a laptop computer, the negative-touch effect can be reduced by thinning the sensed conductive strips (e.g. the second conductive strips). However, if the sensed conductive strips are distributed too sparsely, then when a slant straight line is drawn, a series of coordinates representing the location of the finger may exhibit a slant line with a saw-tooth shape. The more sparse the arrangement of the second conductive strips is, the more prominent the saw tooth will be.

Moreover, when a capacitive touch screen is transparent (a touch sensitive display on a display, for example), in order to obtain a uniform transmittance, the conductive strips on the capacitive touch screen should be as uniformly distributed on the active area of the capacitive touch screen as possible, as shown in FIG. 1E, for example. The conductive pads are rhombic in the drawing, but one with ordinary skill in the art can recognize that the conductive pads can have a polygonal shape (e.g. a hexagonal or octagonal shape) or other geometric shape.

Figure 3A:
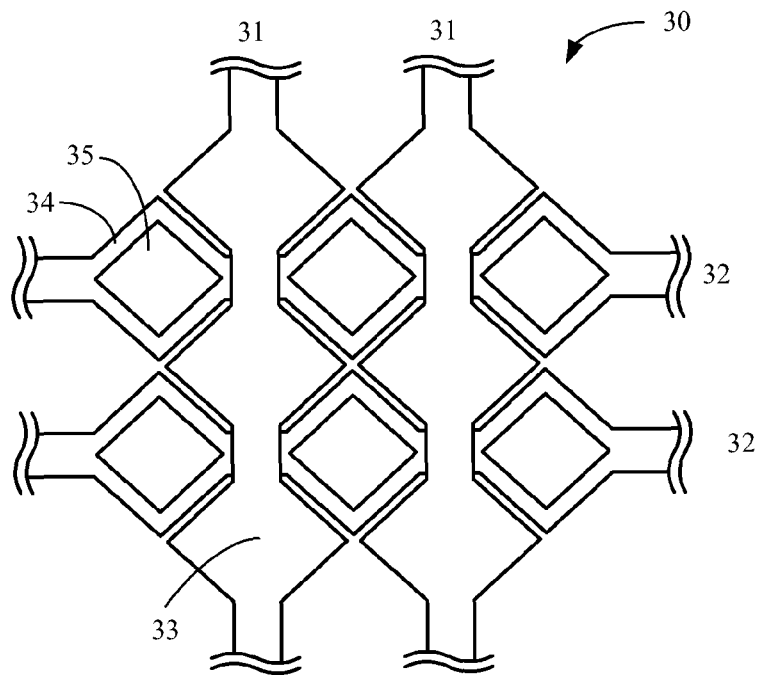
FIGS. 3A and 3B are schematic diagrams depicting a conductive strip pattern with openings according to a first embodiment of the present invention.

Referring to FIG. 3A, a capacitive touch screen according to a first embodiment of the present invention is provided. It includes a conductive strip pattern 30, which includes a plurality of first conductive strips 31 and a plurality of second conductive strips 32. The first conductive strips 31 are formed by a plurality of first conductive pads 33 connected together. The second conductive strips 32 are formed by a plurality of second conductive pads 34 connected together. The second conductive pads have a plurality of openings 35.

Each second conductive pad may have one or more openings. The size (or area) of the opening allows the area of the first conductive strip covered by a touch range of a valid touch larger than a predetermined condition to be greater than the area of the second conductive strip covered. The valid touch may mean that when an external conductive object touches the conductive strip pattern, its location can be determined correctly. With different physical properties of the conductive strip pattern and the external conductive object, the predetermined condition is also different. The physical properties can be properties of a RC circuit.

The valid touch being larger than the predetermined condition requires no measurement, that is, the design of the conductive strip pattern is such that when the touch range exceeds a certain width or area, the exposed area of the circuit provided with a DC signal covered by the touch range is greater than the exposed area of the second conductive strip covered by the touch range.

Figure 3B:
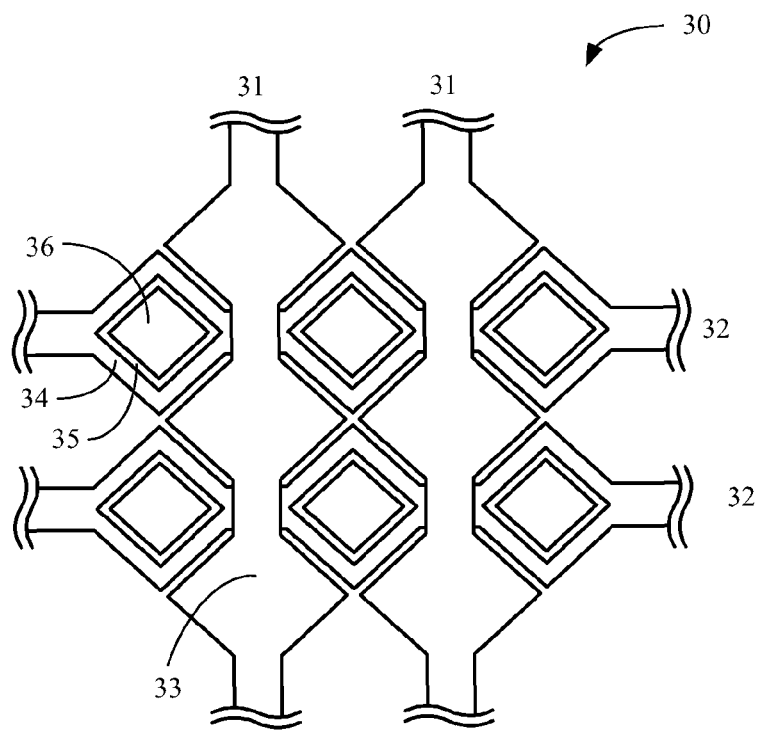

Referring to FIG. 3B, the openings 36 can include a plurality of dummy conductive pads 36. Each opening can have one or more dummy conductive pads. The material of the dummy conductive pads can be the same as that of the second conductive strips, or have the same transparency or color, so as to maintain a uniform transmittance throughout the conductive strip pattern 30.

Therefore, when the profiles of the first and second conductive strips cover or almost cover the entire active area, the openings provided in the second conductive strips can effectively reduce the area of the second conductive strips, and maintain a good precision, and reduce the saw-tooth shape exhibited by the coordinates representing a slant straight line. In fact, from the movement of the finger, the future path of the finger can be predicted, and the saw-tooth shape can thus be adjusted. If the profiles of the f conductive strips cover or almost cover the entire active area, then the signal can be directly adjusted to reduce the saw tooth, so that the above adjustment can be more accurate. In addition, in an example of the present invention, the diagonal length of a conductive pad can be about 5.5 mm. One with ordinary skill in the art can appreciate that the conductive pads may have other sizes, and the present invention is not limited to the above diagonal length.

In addition to providing openings in the second conductive strips to reduce the exposed area thereof, the line width of the second conductive strips can be also be reduced. In short, the exposed area of the first conductive strips is made to be larger than the exposed area of the second conductive strips, or when a touch range is larger than a predetermined condition (e.g. larger than a width or an area), the exposed area of the first conductive strips covered by the touch range is greater than the area of the second conductive strip covered. When this touch range spans over several intersecting regions, the touch range mostly cover exposed first conductive strips.

Accordingly, with a conductive strip pattern or openings described before, when a touch range of each external conductive object on the capacitive touch panel is larger than a predetermined condition, capacitive coupling between each external conductive object and the first conductive strip is greater than capacitive coupling between each external conductive object and the second conductive strip, such that the proportion of a driving signal flowing out of a first conductive strip via at least one first external conductive object in the external conductive objects and into a second conductive strip via at least one second external conductive object in the external conductive objects decreases as the number of second external conductive objects increases.

In addition, the first conductive strips not provided with the driving signal are provided with a DC signal. The proportion of the driving signal flowing out of a first conductive strip via at least one first external conductive object in the external conductive objects and into the circuit provided with the DC signal (e.g. a first conductive strip) via at least one second external conductive object in the external conductive objects increases as the number of second external conductive objects increases.

One with ordinary skill in the art can appreciate that the shapes of the openings 32 and the dummy conductive pads 33 in FIG. 3A may include, but not limited to, rhombus, but any other geometric shapes. In an example of the present invention, the dummy conductive pads and the conductive pads are of the same material.

The capacitive touch screen can be combined with the display to form a capacitive touch sensitive display. In a preferred example of the present invention, there is no rear shielding layer provided with a DC signal between the conductive strips of the capacitive touch screen and the display. A traditional rear shielding layer is provided between the conductive strips and the display and is coupled to ground to block noise coming from the display towards the conductive strips.

If there is no rear shielding layer, the thickness of the capacitive touch screen can be reduced significantly, but there has to be some measures in place for eliminating the interferences caused by the noise of the display. Accordingly, the present invention uses a control circuit to generate sensing information based on mutual capacitive coupling signals provided by the second conductive strips, and to reduce common mode noise by subtracting signals of the conductive strips with each other.

In an example of the present invention, a plurality of consecutive differential values is generated based on the mutual capacitive coupling signals provided by the second conductive strips. Each value is the difference between the signals of a pair of conductive strips (e.g. second conductive strips). For example, n conductive strips generate n−1 differential values. Since the interferences of the display experienced by adjacent conductive strips are similar, subtracting the signals of a pair of adjacent conductive strips can effectively remove most of the noise. In other words, the above difference suppresses the noise coming from the display.

In another example of the present invention, a plurality of consecutive dual differential values is generated based on the mutual capacitive coupling signals provided by the second conductive strips. Each value is the difference between the signal differences between two pairs of conductive strips among three conductive strips. For example, n conductive strips generate n−2 dual differential values. Each dual differential value is the difference between the signal difference between a first pair of conductive strips and the signal difference of a second pair of conductive strips. Since the interferences of the display experienced by adjacent conductive strips are similar, subtracting the signals of a pair of adjacent conductive strips can effectively remove most of the noise.

In an example of the present invention, a rear shielding layer coupled with a DC signal may exist between the capacitive touch screen and the display, and the overall thickness is greater than that of the capacitive touch screen without a rear shielding layer.

However, when the capacitive touch screen is deformed under pressure, the distance between each conductive strip and the display will change, and so would the level of noise interference experienced. For example, the capacitive touch screen is only fixed to the display around the periphery, so part of the capacitive touch screen may deform when force is exerted. Since the level of deformation among adjacent conductive strips will be similar to one another, the changes in the signal difference of a first pair of conductive strips and of a second pair of conductive strips among three conductive strips due to deformation will be similar. By subtracting the signal differences of the first and second pairs of conductive strips from one another, most of the changes in noise interferences caused by different levels of deformations can be effectively removed. In other words, the dual differential values can effectively suppress the noise coming from the display, as well as the changes in noise interferences caused by different levels of deformations The differential values can be obtained by sequentially or simultaneously detecting some or all of the second conductive strips, and converting analog signals into digital data and generating sensing information from the digital data. Or, during or after the detection of some or all of the second conductive strips, a subtractor circuit (e.g. a differential amplifier) generates analog signals of the differential values, and then they are converted into digital data to generate sensing information.

Figure 4A:
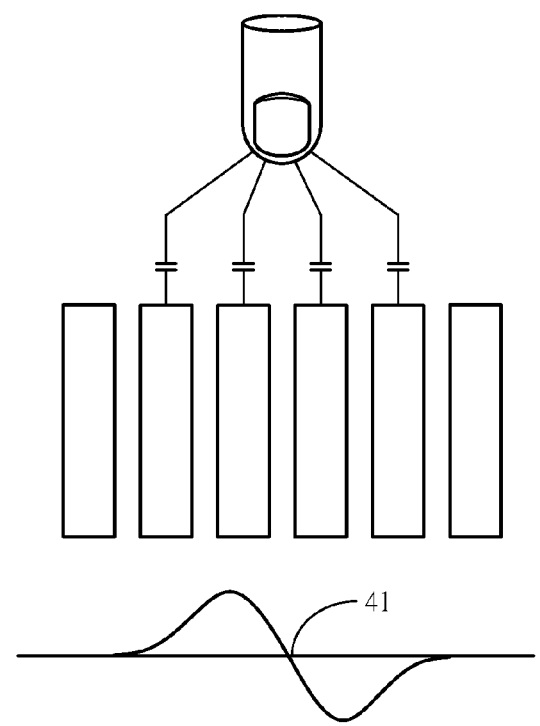
FIGS. 4A and 4B are schematic diagrams depicting sensing information including consecutive differential and dual differential values according to the present invention.
Figure 4B:
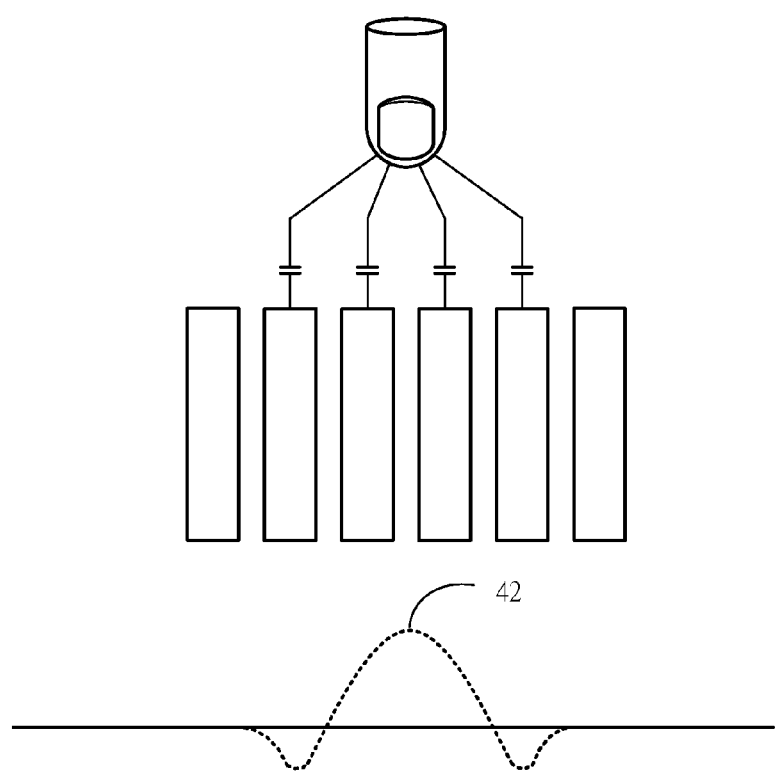

In the above consecutive differential or dual differential values, the portion corresponds to the touch or approach of an external conductive object will exhibit one or more zero-crossing points. A zero-crossing point exists between a positive value and a negative value. Referring to FIG. 4A, a schematic diagram illustrating sensing information including consecutive differential values is shown. A zero-crossing point exists at a place which corresponds to the touch or approach of an external conductive object. This zero-crossing point corresponds to the location of the external conductive object, and the location or coordinate of the zero-crossing point can be calculated by the slope between the positive and negative values at either side of this zero-crossing point. Referring to FIG. 4B, a schematic diagram illustrating sensing information including consecutive dual differential values is shown. A pair of zero-crossing points exists at a place which corresponds to the touch or approach of an external conductive object. The peak of this pair of zero-crossing points corresponds to the location of the external conductive object, and the location of the peak can be calculated by scanning the values at either side of the peak, for example, by calculating the location of center of mass based on the values at either side of the peak.

In mutual capacitive detection, an image corresponding to the above intersecting regions can be obtained. For example, FIGS. 4A and 4B correspond to one-dimensional (1-D) sensing information on a single first conductive strip. By gathering 2-D sensing information from 1-D sensing information of the intersecting regions on each first conductive strip, an image is formed.

In an example of the present invention, an initial image is recorded before the capacitive touch screen is being touched. Thereafter, the initial image is compared with the image at each scan to determine the location of each external conductive object. For example, a differential image is obtained by subtracting each corresponding values in the image at each scan and the initial image from one another, and the location of each external conductive object is determined based on the variations in the differential image.

Referring to FIG. 5, a flowchart illustrating a detection method for a capacitive touch screen according to a second embodiment of the present invention is shown. First, in step 510, a capacitive touch sensitive display without a rear shielding layer is provided, which includes a plurality of exposed conductive strips and a display. The conductive strips include a plurality of first conductive strips operatively provided with a driving signal during mutual capacitive detection and a plurality of second conductive strips providing mutual capacitive coupling signals. The conductive strips are separated from each other. In addition, there is no rear shielding layer provided with a DC signal between the display and the conductive strips. The conductive strip pattern allows that, when a touch range of each external conductive object on the capacitive touch panel is larger than a predetermined condition, capacitive coupling between each external conductive object and the first conductive strip is greater than capacitive coupling between each external conductive object and the second conductive strip, such that the proportion of the driving signal flowing out of the first conductive strip via at least one first external conductive object in the external conductive objects and into the second conductive strip via at least one second external conductive object in the external conductive objects decreases as the number of second external conductive objects increases.

In addition, the first conductive strips not provided with the driving signal are provided with a DC signal. The proportion of the driving signal flowing out of the first conductive strip via at least one first external conductive object in the external conductive objects and into a circuit provided with the DC signal (e.g. a first conductive strip) via at least one second external conductive object in the external conductive objects increases as the number of second external conductive objects increases.

Next, as shown in step 520, at least one first conductive strip is simultaneously and continuously provided with the driving signal. For example, the driving/detecting unit 130 provides the driving signal to at least one first conductive strip, one at a time, or simultaneously to adjacent two or three first conductive strips.

In addition, as shown in step 530, each time the driving signal is provided, sensing information is generated based on mutual capacitive coupling signals provided by the second conductive strips. Each value of the sensing information is the difference between a pair of second conductive strips or the difference between signal differences of two pairs of conductive strips among three conductive strips. The difference suppresses the noise coming from the display.

Other relevant details of this embodiment are disclosed in the previous descriptions, and will not be further described.

The present invention further includes a guarding pattern made of a transparent or opaque conductive material. The guarding pattern and the conductive strip pattern above (e.g. first and second conductive strips) are exposed from each other, wherein the guarding pattern is provided with a DC signal. If the capacitive touch screen is seen from the insulating surface layer, there is only a small overlap portion between the guarding pattern and the conductive strip pattern, and the guarding pattern and the conductive strip pattern are exposed from gaps of each other.

In an example of the present invention, when the touch range is larger than a predetermined condition, the touch range inevitably covers the guarding pattern. In another example of the present invention, when the touch range is larger than a predetermined condition, the area of the guarding pattern covered by the touch range is larger than the area of the second conductive strips covered. In yet another example of the present invention, when the touch range is larger than a predetermined condition, the area of the circuit provided with the DC signal covered by the touch range is larger than the area of the second conductive strips covered, wherein the circuit provided with the DC signal includes part of the guarding pattern and the first conductive strips.

Figure 6:
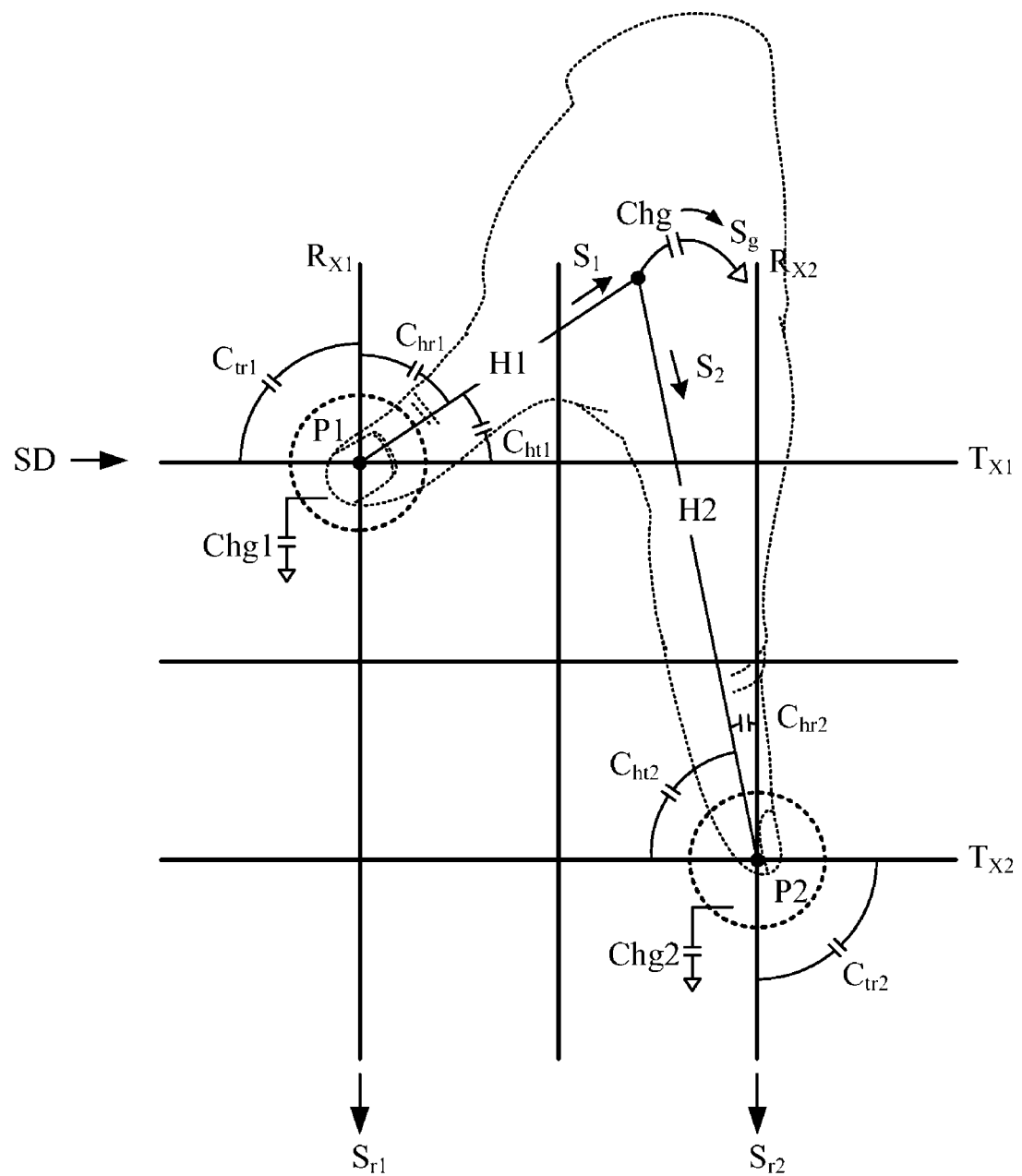
FIG. 6 is a schematic diagram for analyzing the negative-touch effect on a capacitive touch screen with a guarding pattern according to the present invention.

Referring to FIG. 6, a schematic diagram for analyzing the negative-touch effect on a capacitive touch screen with a guarding pattern is shown. In comparison to FIG. 2A, on this capacitive touch screen with the guarding pattern, capacitive coupling Chg1 occurs between the first finger H1 and the guarding pattern, and capacitive coupling Chg2 occurs between the second finger H2 and the guarding pattern.

From impedance/capacitance analysis, the capacitance to the circuit provided with the DC signal in the second touch zone P2 is Chg+Cht2+Chg2, and the capacitance of the negative-touch signal with the second conductive strip Rx2 is Chr2. Thus, the ratio of an negative touch to a true touch is GTR=(Chr2)/(Chg+Cht2+Chg2). The smaller this ratio GTR is, the smaller the cancelling effect of the negative-touch signals on the true-touch signals. In order to eliminate or reduce the effect of the negative-touch signals on the true-touch signals, in addition to reducing the area of exposed second conductive strips, the area of the circuit provided with the DC signal can be enlarged, such that when the second finger H2 touches or approaches it, most of the touch range is on the circuit provided with the DC signal (e.g. the guarding pattern and the first conductive strips that are not driven by the driving signal).

In an example of the present invention, the guarding pattern and the conductive strip pattern of a SITO structure are on the same layer. In another example of the present invention, the guarding pattern and the first and second conductive strips of a DITO structure are on the same layer, wherein a preferred arrangement is to have the guarding pattern located on an upper layer closer to the insulating surface layer.

Figure 7A:
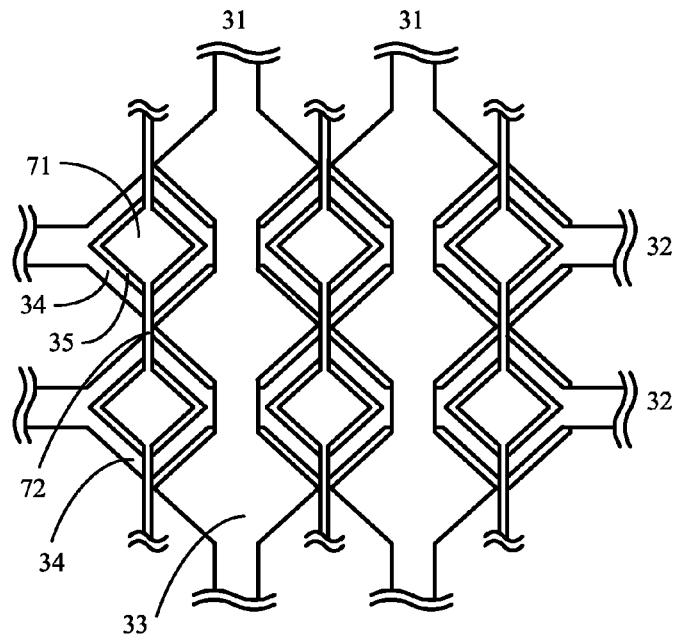
FIG. 7A is a schematic diagram depicting a guarding pattern according to a third embodiment of the present invention.

Referring to FIG. 7A, a schematic diagram depicting a guarding pattern according to a third embodiment of the present invention is shown. The guarding pattern includes a plurality of guarding pads 71 and guarding connecting lines 72. In comparison to FIG. 3A, the guarding pads 71 are provided in the openings 35, and the guarding pads 71 are provided with a DC signal (or ground) connected in series or in parallel by the guarding connecting lines.

In comparison to FIG. 3A, the guarding pattern of this embodiment includes the guarding pads 71 provided in the openings 35; and the guarding pads 71 for providing the guarding pads 71 with the DC signal in series and/or in parallel.

Figure 7B:
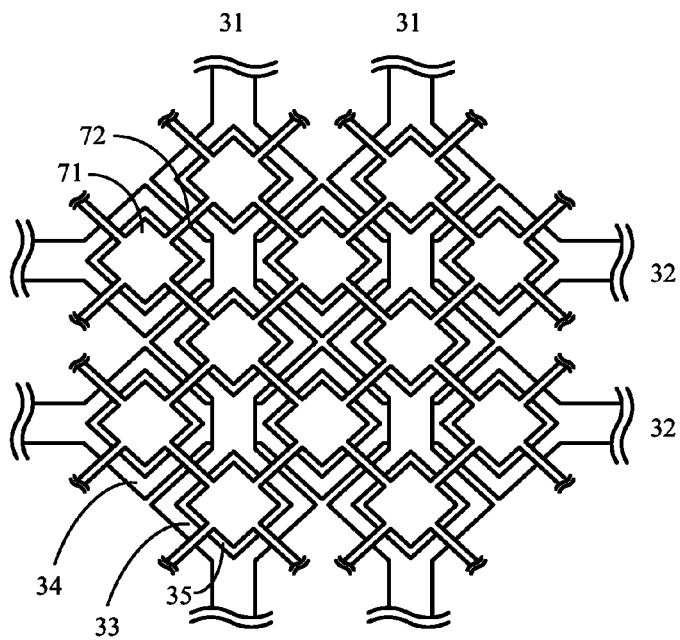
FIG. 7B is a schematic diagram depicting a guarding pattern according to a fourth embodiment of the present invention.

Referring to FIG. 7B, a schematic diagram depicting a guarding pattern according to a fourth embodiment of the present invention is shown. The guarding pattern includes a plurality of guarding pads 71 and guarding connecting lines 72. In comparison to FIG. 7A, openings are also provided in the first conductive strip 31, and the guarding pads 71 are also provided in the openings 35 of the first conductive strips 31.

In comparison to FIG. 3A, the guarding pattern of this embodiment includes the guarding pads 71 provided in the openings 35; and the guarding pads 71 for providing the guarding pads 71 with the DC signal in series and/or in parallel.

In FIGS. 7A and 7B, the conductive strips include a plurality of rhombic conductive pads. However, one with ordinary skill in the art can appreciate that the shape of the conductive pads can be of tetragon, hexagon, octagon or any other geometric shapes. In addition, the conductive strips can also have shapes other than a straight line.

Figure 7C:
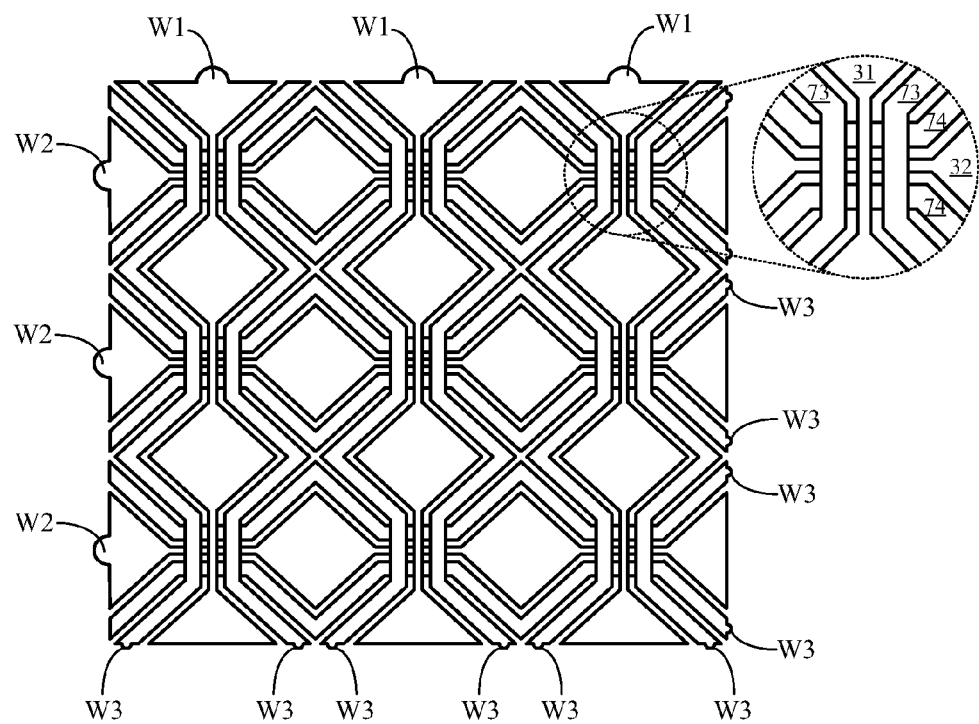
FIG. 7C is a schematic diagram depicting a guarding pattern according to a fifth embodiment of the present invention.

Referring to FIG. 7C, a schematic diagram depicting a guarding pattern according to a fifth embodiment of the present invention is shown. A third conductive strip 73 is provided at either side of a first conductive strip 31, and a fourth conductive strip 74 is provided at either side of a second conductive strip 32, wherein the third conductive strips 73 and the fourth conductive strips 74 form the guarding pattern. In other words, the first conductive strips 31 and the second conductive strips 32 intersect each other at a plurality of intersecting regions, and a guarding conductive strip (i.e. a third conductive strip 73 and a fourth conductive strip 74) is provided at either side of each of the first conductive strips 31 and second conductive strips 32. Moreover, the first conductive strips 31, the second conductive strips 32, the third conductive strips 73 and the fourth conductive strip 74 are isolated from one another, wherein the first conductive strips 31 and the third conductive strips 73 overlap the second conductive strips 32 and the fourth conductive strips 74.

The third conductive strips 73 and the fourth conductive strips 74 form the guarding conductive strips of the guarding pattern, and a guarding conductive strip is adjacent to each first conductive strip 31 and each second conductive strip 32 at either side thereof. Further, the outline of the guarding conductive strips matches the outline of the adjacent first conductive strip 31 or second conductive strip 32.

The first conductive strips shown have contact points W1 connecting the strips to a control circuit or controller, e.g. said driving/detecting unit 130, for operatively coupling a driving signal. In addition, the second conductive strips shown have contact points W2 connecting the strips to a control circuit or controller, e.g. said driving/detecting unit 130, for providing a mutual capacitive coupling signal. Furthermore, the guarding conductive strips have contact points W3 for connecting the strips to a DC signal.

Figure 7D:
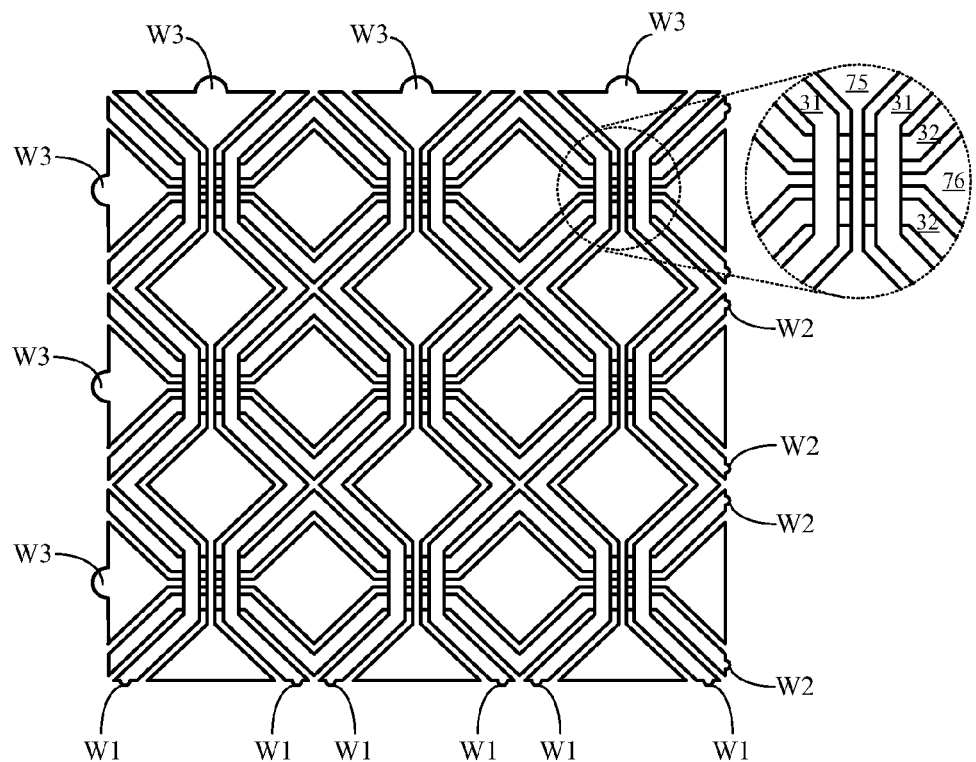
FIG. 7D is a schematic diagram depicting a guarding pattern according to a sixth embodiment of the present invention.

Referring to FIG. 7D, a schematic diagram depicting a guarding pattern according to a sixth embodiment of the present invention is shown. The guarding pattern includes a plurality of third conductive strips 75 and fourth conductive strips 76. The third conductive strips 75 and the fourth conductive strips 76 intersect each other, wherein, at the intersections, the third conductive strips 75 and the fourth conductive strips 76 can be coupled together or isolated. A first conductive strip 31 is provided at either side of a third conductive strip 75, and a second conductive strip 32 is provided at either side of a fourth conductive strip 76, wherein the first conductive strips 31 and the second conductive strips 32 intersect and are isolated from each other. In addition, a conductive strip pattern formed by the first conductive strips 31 and the second conductive strips 32 is isolated from the guarding pattern.

In other words, a first conductive strip 31 or a second conductive strip 32 is adjacent to each guarding conductive strip at either side thereof. Further, the outline of the first conductive strips 31 and the second conductive strips 32 matches the outline of the adjacent guarding conductive strip.

Referring to FIG. 7E, a schematic diagram depicting a guarding pattern according to a seventh embodiment of the present invention is shown. The first conductive strips 31 and the second conductive strips 32 intersect at a plurality of intersecting regions, and guarding conductive strips 77 are between the first conductive strips 31 and the second conductive strips 32, wherein openings in the guarding conductive strips 77 and intervals between the guarding conductive strips 77 define the exposed parts of the first conductive strips 31 and the second conductive strips 32. In other words, the guarding conductive strips 77 form a guarding pattern, and the first conductive strips 31, the second conductive strips 32, and the guarding conductive strips 77 are exposed from one another, wherein the guarding conductive strips 77 and one (in a DITO structure) or both (in a SITO structure) of the first conductive strips 31 and second conductive strips 32 are on the same layer. In a DITO structure, a preferred arrangement is to have the guarding conductive strips 77 located on an upper layer closer to the insulating surface layer, wherein the first conductive strips 31 are also arranged on the upper layer.

In other words, the guarding conductive strips have a plurality of openings. The intervals between the guarding conductive strips expose one of the first conductive strips or the second conductive strips. The openings of the guarding conductive strips expose the other of the first conductive strips or the second conductive strips. In a preferred example of the present invention, the intervals between the guarding conductive strips expose the first conductive strips, and the openings of the guarding conductive strips expose the second conductive strips.

In a best mode of the present invention, the guarding pattern and the first conductive strips are on the same layer, wherein the second conductive strips are on the same layer as the first conductive strips or on a layer further away from the insulating surface layer that would be touched or approached by external conductive objects.

If there is no guarding pattern, the first and second conductive strips will generate an electric field due to the driving signal. When a guarding pattern is provided, the guarding pattern between the first and second conductive strips will divide said electric field into an electric field between the first conductive strips and the guarding pattern, whereby reducing the electric field between the first and second conductive strips.

In other words, the guarding pattern additionally provides a path for the driving signal to flow to the system ground via an external conductive object, and this results in a greater change in signal corresponding to the touch or approach by the external conductive object. In particular, the thinner the guarding insulating surface layer, the larger the portion of the driving signal flowing into to the system ground via the external conductive object.

Since the human body is one of the sources of noise, noise may be injected into the device upon contact, which causes conductive interference. This is usually due to the potential difference between the ground potential at which the human is located and the ground potential of the device. For example, conductive interference VA can be coupled from the human body to the receiving end, and the interference signal received by the second conductive strip Rx1 is $Ir=((Chr1)/(Chg1+Chr1+Cht1))*In$, while the other signals are sunk by the circuit coupled with the DC signal, for example, $Ig=((Chg1+Cht1)/(Chg1+Chr1+Cht1)*In$, wherein In is the current of the conductive interference. If Chg1 is much greater than Chr1+Cht1 or Chg1 is much greater than Chr1, resistance to the noise propagated from the human body is proportional to the size of the exposed area of the guarding pattern. Accordingly, the shielding zone can be adjusted to significantly lower the conductive interference.

Assuming the first and second conductive strips do not intersect with each other, and an external conductive object only affects the electric field beyond the insulating surface layer, the provision of the insulating surface layer reduces the baseline of the signal of a second conductive strip before the insulating surface layer is touched or approached. This relatively results in a more significant change in signal of the second conductive strip after the insulating surface layer is touched or approached by an external conductive object.

It should be noted that if the exposed area of the guarding pattern is too small or the insulating surface layer is too thick, capacitive coupling between the guarding pattern and the human body becomes smaller, or even negligible. The only advantage of such a design is to isolate the direct capacitive coupling between the first and second conductive strips, so that capacitive coupling signal of the second conductive strip before a touch or approach is relatively smaller, i.e., the baseline is relatively smaller, and making the change in signal seem greater. However, the influence of the guarding pattern on the change in signal is effectively very little, even none. For example, all or most of electric field lines between the first conductive strips and the guarding pattern are in the insulating surface layer, which are very little, if at all, affected by external conductive objects.

However, in the technical scheme provided by the present invention, capacitive coupling between the guarding pattern and an external conductive object is larger than capacitive coupling between the second conductive strips and the external conductive object or capacitive coupling between the conductive strip pattern and the external conductive object. Thus, in addition to reduction of negative-touch effect, noise interference coming from the external conductive object can also be reduced. This benefit is more prominent when the insulating surface layer is less than 0.5 mm, or even less than 0.3 mm. If this is used in conjunction with conversion of the mutual capacitive sensing information into continuous differential values or continuous dual differential values, a rear shielding layer is not required, making not only the surface layer, but also the back layer of the capacitive touch screen thinner, even to an overall thickness of less than 0.5 mm.

Referring to FIG. 8, a detection method of a capacitive touch screen according to a eighth embodiment of the present invention is shown. First, in step 810, a capacitive touch screen with a guarding pattern is provided, the guarding pattern and a conductive strip pattern on the capacitive touch screen being exposed from one another. Next, in step 820, a driving signal is simultaneously and continuously provided to at least one first conductive strip, and a DC signal is provided to first conductive strips not driven by the driving signal. In addition, in step 830, sensing information is generated based on the mutual capacitive coupling signals provided by the second conductive strips each time the driving signal is provided, wherein each value of the sensing information is a difference between a pair of signals of the second conductive strips or the difference between signal differences of two pair of conductive strips among three conductive strips, and the difference suppresses the noise coming from the display.

In an example of the present invention, the guarding pattern and the conductive strip pattern are not on the same layer. In a preferred example of the present invention, the guarding pattern is positioned on a layer above the conductive strip pattern, that is, the guarding pattern is closer to the insulating surface layer (or external conductive objects) than the conductive strip pattern.

Figure 9A:
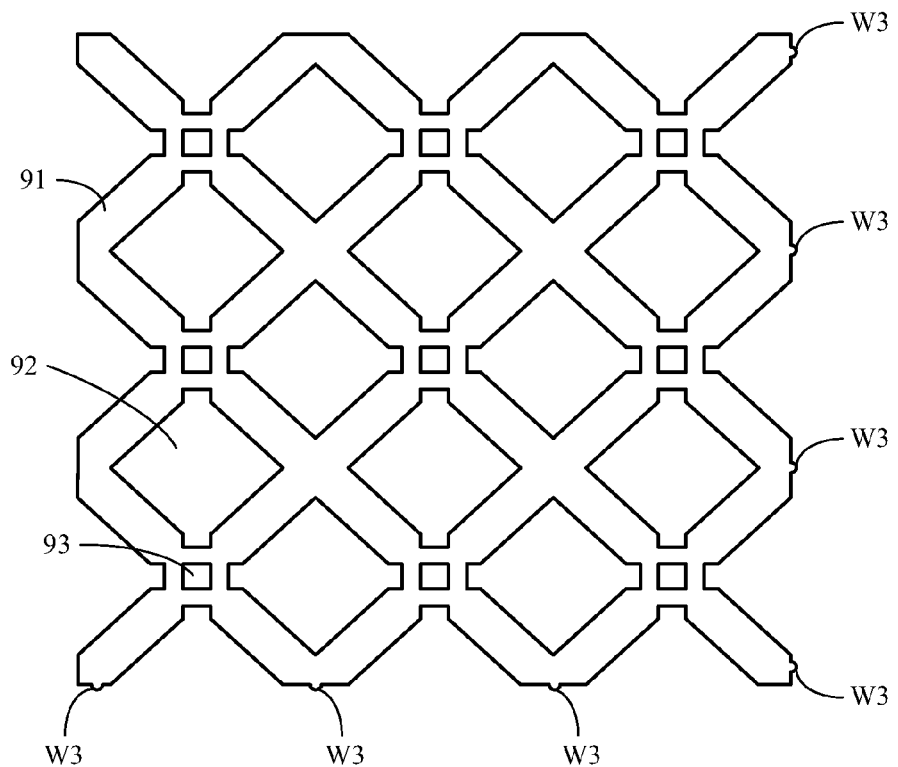
FIG. 9A is a schematic diagram showing a guarding pattern proposed by a ninth embodiment of the present invention.
Figure 9B:
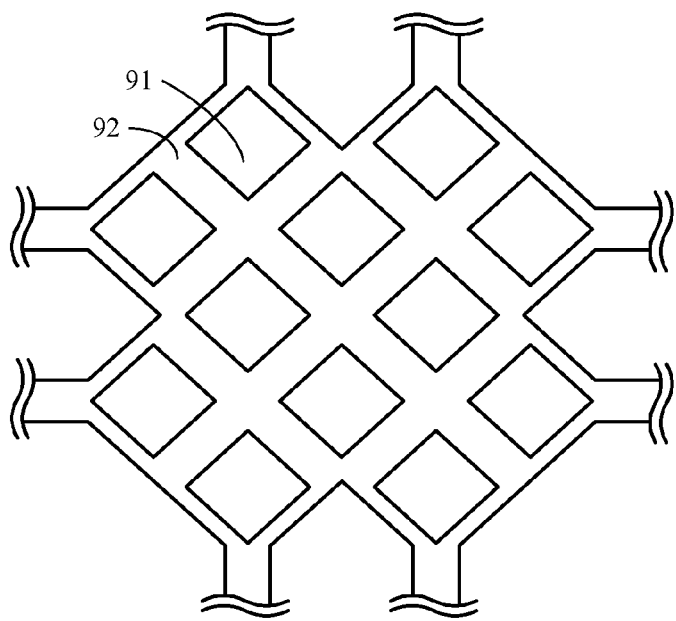
FIG. 9B is a schematic diagram showing a guarding pattern proposed by a tenth embodiment of the present invention.

Referring to FIG. 9A, which shows a conductive strip pattern proposed by a ninth embodiment of the present invention. The conductive strip pattern 91 has a plurality of openings 92 and 93, wherein the openings 93 expose the intersecting regions of the conductive strips in the conductive strip pattern, and the openings 92 expose non-intersecting portions of the conductive strips. Referring to FIG. 9B, which shows a conductive strip pattern proposed by a tenth embodiment of the present invention. The conductive strip pattern 91 has a plurality of opening 92, wherein the openings 92 expose non-intersecting portions of the conductive strips.

The conductive strips can be long strips, or composed of several connecting lines connected to conductive pads. In an example of the present invention, the openings 92 expose complete conductive pads. In another example of the present invention, the openings 92 expose parts of the conductive pads, and the conductive strip pattern 91 covers parts of the conductive pads, for example, the periphery of the conductive pads.

In contrast to the case where the guarding pattern and the conductive strip pattern are on the same layer, since the guarding pattern is closer to external conductive objects, so a smaller exposed area can achieve the same effect of reducing the negative-touch effect. On the other hand, the exposed area of the conductive strips is larger, so the change in the capacitive coupling of a true touch also becomes greater.

In addition, in an example of the present invention, the area of the first conductive strips exposed by the openings 92 is greater than the area of the second conductive strips exposed by the openings 92, Accordingly, based on the detection method for a capacitive touch screen, in combination with the present embodiment, the effect of reducing negative-touch effect is improved, but this comes at the cost of increasing the thickness of an additional layer. Other forms and relevant details of the conductive strip pattern have been disclosed in the previous descriptions, and will not be repeated.

In the prior art, as the number of external conductive objects that cause negative touches increases, more of the driving signal will flow into the conductive strips providing mutual capacitive coupling signals (e.g. the above second conductive strips) by capacitive coupling of a plurality of external conductive objects (e.g. the above first and second conductive objects). If the true-touch signal is decreased by one or more of the negative-touch signals, judgment of true-touch locations is prone to errors. Thus, the number of the locations of the external conductive objects that can be determined simultaneously is limited by the level of tolerance in terms of a true-touch signal being reduced by negative-touch signals. This problem is exacerbated when the conductive strips providing mutual capacitive coupling signals are closer to the external conductive objects. That is, the thinner the insulating surface layer or the capacitive touch screen is, the more severe the negative-touch effect will be.

On the contrary, in the technical solutions provided by the present invention, the amount of capacitive coupling between the second external conductive object and the circuit coupled to the DC signal is greater than the amount of capacitive coupling between the second external conductive object and the conductive strips providing the mutual capacitive coupling signals. More specifically, when there are more external conductive object that cause negative touches or the insulating surface layer is thinner, capacitive coupling between the second external conductive object and the circuit coupled to the DC signal is even greater than the amount of capacitive coupling between the second external conductive object and the conductive strips providing the mutual capacitive coupling signals, so that the amount of driving signal flowing into the conductive strips providing the mutual capacitive coupling signals by capacitive coupling of a plurality of external conductive objects is less. This is contrary to the shortcoming of the prior art.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A detection method for a capacitive touch screen, comprising:
   providing a capacitive touch screen, including:
      a conductive strip pattern having a plurality of conductive strips exposed from each other, the conductive strip pattern including:
         a plurality of first conductive strips operatively provided with a driving signal during mutual capacitive detection; and
         a plurality of second conductive strips providing mutual capacitive coupling signals, the first conductive strips and the second conductive strips being exposed and separated from each other; and
      a guarding pattern including a plurality of openings and overlying the conductive strip pattern, wherein the guarding pattern is provided with a direct current (DC) signal, and the conductive strip pattern is exposed from the openings;
   simultaneously and continuously providing the driving signal to at least one first conductive strip, and providing a DC signal to first conductive strips not driven by the driving signal; and
   generating sensing information based on the mutual capacitive coupling signals provided by the second conductive strips each time the driving signal being provided, wherein each value of the sensing information is the difference between a pair of second conductive strips or the difference between signal differences of two pairs of conductive strips among three conductive strips, and the difference suppresses noise coming from a display, wherein this conductive strip pattern allows that, when a touch area of each external conductive object on the capacitive touch screen is larger than a predetermined condition, the exposed area of the guarding pattern covered by each touch area is larger than the exposed area of the second conductive strips covered by the touch area or larger than the exposed area of the conductive strip pattern covered by the touch area.

2. The detection method according to claim 1, wherein the openings expose a plurality of intersecting regions of the first conductive strips and the second conductive strips.

3. The detection method according to claim 1, wherein the guarding pattern covers a plurality of intersecting regions of the first conductive strips and the second conductive strips.

4. The detection method according to claim 1, wherein the guarding pattern includes a plurality of guarding conductive strips, the guarding conductive strips have a plurality of openings, wherein the intervals between the guarding conductive strips expose one of the first conductive strips and the second conductive strips, and the openings expose the other of the first conductive strips and the second conductive strips.

5. The detection method according to claim 1, wherein the second conductive strips are on the same layer as the first conductive strips or on a layer further away from an insulating surface layer, wherein the external conductive objects approach or touch the insulating surface layer, and the guarding pattern is positioned between the insulating surface layer and the conductive strip pattern.

6. The detection method according to claim 1, wherein capacitive coupling between each external conductive object and the second conductive strips is smaller than capacitive coupling between the external conductive object and the guarding pattern or smaller than capacitive coupling between the external conductive object and the guarding pattern and the first conductive strips.

7. The detection method according to claim 1, wherein the predetermined condition is a width or an area, and the exposed area of the first conductive strips is greater than the exposed area of the second conductive strips.

8. The detection method according to claim 1, wherein the periphery of the capacitive touch screen is fixed to a display, and the portion of the capacitive touch screen not fixed to the display deforms under pressure, wherein each value of the sensing information is the difference between signal differences between the first two conductive strips and the latter two conductive strips among the three conductive strips.

9. The detection method according to claim 1, wherein the first conductive strips and the second conductive strips are composed of a plurality of connecting lines connected with a plurality of conductive pads, and the openings expose the conductive pads.

10. A capacitive touch screen, comprising:
a conductive strip pattern having a plurality of conductive strips exposed from each other, the conductive strip pattern including:
a plurality of first conductive strips operatively provided with a driving signal during mutual capacitive detection, wherein first conductive strips not provided with the driving signal are provided with a direct current (DC) signal; and
a plurality of second conductive strips providing mutual capacitive coupling signals, the first conductive strips and the second conductive strips being exposed and separated from each other; and
a guarding pattern including a plurality of openings and overlying the conductive strip pattern, wherein the guarding pattern is provided with the DC signal, and the guarding pattern and the conductive strip pattern is exposed from the openings,
wherein the conductive strip pattern and the guarding pattern allow that, when a touch area of each external conductive object on the capacitive touch screen is larger than a predetermined condition, capacitive coupling between each external conductive object and the guarding pattern is larger than capacitive coupling between the external conductive object and the second conductive strips or larger than capacitive coupling between the external conductive object and the conductive strip pattern.

11. The capacitive touch screen according to claim 10, wherein the openings expose a plurality of intersecting regions of the first conductive strips and the second conductive strips.

12. The capacitive touch screen according to claim 10, wherein the guarding pattern covers a plurality of intersecting regions of the first conductive strips and the second conductive strips.

13. The capacitive touch screen according to claim 10, wherein the guarding pattern includes a plurality of guarding conductive strips, the guarding conductive strips have a plurality of openings, wherein the intervals between the guarding conductive strips expose one of the first conductive strips and the second conductive strips, and the openings expose the other of the first conductive strips and the second conductive strips.

14. The capacitive touch screen according to claim 10, wherein the second conductive strips are on the same layer as the first conductive strips or on a layer further away from an insulating surface layer, wherein the external conductive objects approach or touch the insulating surface layer, and the guarding pattern is positioned between the insulating surface layer and the conductive strip pattern.

15. The capacitive touch screen according to claim 10, wherein the exposed area of the guarding pattern covered by the touch area is larger than the exposed area of the second conductive strips covered by the touch range, or and the exposed areas of the first conductive strips provided with the DC signal and the guarding pattern covered by the touch range is larger than the exposed area of the second conductive strips covered by the touch range.

16. The capacitive touch screen according to claim 10, wherein the predetermined condition is a width or an area, and the exposed area of the first conductive strips is greater than the exposed area of the second conductive strips.

17. The capacitive touch screen according to claim 10, further comprising a control circuit for performing the following operations:
simultaneously and continuously providing the driving signal to at least one first conductive strip; and
generating sensing information based on the mutual capacitive coupling signals provided by the second conductive strips each time the driving signal being provided, wherein each value of the sensing information is the difference between a pair of second conductive strips or the difference between signal differences of two pairs of conductive strips among three conductive strips,
wherein the capacitive touch screen is fixed to a display, and a rear shielding layer coupled to the DC potential is not present between the display and the conductive strips, and the difference suppresses noise coming from the display.

18. The capacitive touch screen according to claim 17, wherein the periphery of the capacitive touch screen is fixed to the display, and the portion of the capacitive touch screen not fixed to the display deforms under pressure, wherein each value of the sensing information is the difference between signal differences between the first two conductive strips and the latter two conductive strips among the three conductive strips.

* * * * *